United States Patent
Ding

(10) Patent No.: US 9,179,249 B2
(45) Date of Patent: Nov. 3, 2015

(54) METHOD FOR POSITIONING WIRELESS TERMINAL, AND RELATED DEVICE AND SYSTEM

(71) Applicant: Huawei Device Co., LTD, Shenzhen (CN)

(72) Inventor: Zhiming Ding, Shenzhen (CN)

(73) Assignee: Huawei Device Co., LTD., Shenzhen (CN)

( * ) Notice: Subject to any disclaimer, the term of this patent is extended or adjusted under 35 U.S.C. 154(b) by 235 days.

(21) Appl. No.: 13/872,963

(22) Filed: Apr. 29, 2013

(65) Prior Publication Data
US 2013/0316730 A1  Nov. 28, 2013

(30) Foreign Application Priority Data
Apr. 28, 2012 (CN) .......................... 2012 1 0132499

(51) Int. Cl.
| | |
|---|---|
| *H04W 4/02* | (2009.01) |
| *H04W 64/00* | (2009.01) |
| *H04W 4/20* | (2009.01) |
| *G01S 5/14* | (2006.01) |
| *H04W 88/08* | (2009.01) |
| *G01S 5/02* | (2010.01) |

(52) U.S. Cl.
CPC .. *H04W 4/02* (2013.01); *G01S 5/14* (2013.01); *H04W 4/20* (2013.01); *H04W 64/00* (2013.01); *G01S 5/0252* (2013.01); *H04W 88/08* (2013.01); *Y02B 60/50* (2013.01)

(58) Field of Classification Search
CPC ........................................................ H04W 4/02
USPC ........... 455/456.1, 456.2, 456.3, 456.5, 456.6
See application file for complete search history.

(56) References Cited

U.S. PATENT DOCUMENTS

| | | | |
|---|---|---|---|
| 6,226,317 B1 * | 5/2001 | Bruckert et al. ............... | 375/146 |
| 6,243,588 B1 * | 6/2001 | Koorapaty et al. ........ | 455/456.2 |
| 6,438,380 B1 * | 8/2002 | Bi et al. ..................... | 455/456.1 |
| 6,603,976 B1 * | 8/2003 | Amirijoo et al. ........... | 455/456.1 |
| 8,045,930 B2 * | 10/2011 | Ward ............................... | 455/69 |
| 2001/0051526 A1 * | 12/2001 | Ruutu et al. .................. | 455/456 |
| 2003/0146871 A1 | 8/2003 | Karr et al. | |
| 2010/0150117 A1 | 6/2010 | Aweya et al. | |
| 2012/0244880 A1 * | 9/2012 | Lee et al. .................... | 455/456.1 |

(Continued)

FOREIGN PATENT DOCUMENTS

| | | |
|---|---|---|
| CN | 1387733 A | 12/2002 |
| CN | 001838821 A | 9/2006 |

(Continued)

*Primary Examiner* — Christopher M Brandt
(74) *Attorney, Agent, or Firm* — Slater & Matsil, L.L.P.

(57) ABSTRACT

A method for positioning a wireless terminal, and a related device and system are provided. The method includes: obtaining, by a wireless terminal, a positioning service period and an identifier of a positioning channel from a first access point; switching, by the wireless terminal, to the positioning channel in the positioning service period; and broadcasting, by the wireless terminal, a location measurement message through the positioning channel, so that at least three access points in an access point group where the first access point is located obtain positioning measurement data after receiving the location measurement message, so as to estimate a location of the wireless terminal. Embodiments of the present invention can shorten positioning time of the wireless terminal, reduce power consumption, and improve utilization of a network wireless channel.

20 Claims, 11 Drawing Sheets

(56) References Cited

U.S. PATENT DOCUMENTS

2013/0005347 A1* 1/2013 Curticapean .............. 455/456.1
2013/0281110 A1* 10/2013 Zelinka .................... 455/456.1

FOREIGN PATENT DOCUMENTS

| | | |
|---|---|---|
| CN | 101119390 A | 2/2008 |
| WO | 2008109348 A1 | 9/2008 |

* cited by examiner

METHOD FOR POSITIONING WIRELESS TERMINAL, AND RELATED DEVICE AND SYSTEM

CROSS-REFERENCE TO RELATED APPLICATIONS

This application claims priority to Chinese Patent Application No. 201210132499.2, filed on Apr. 28, 2012, which is hereby incorporated by reference in its entirety.

FIELD OF THE INVENTION

The present invention relates to the technical field of communications, and in particular, to a method for positioning a wireless terminal, and a related device and system.

BACKGROUND OF THE INVENTION

Currently, a wireless terminal (for example, a cell phone, and a PDA) having a wireless fidelity (Wireless Fidelity, Wi-Fi) function has been widely applied. When a subscriber is in a large shopping mall or indoor, the subscriber can determine a location of the subscriber by using a wireless terminal that has a Wi-Fi function and is carried by the subscriber.

Referring to FIG. 1, FIG. 1 is a flow chart of a conventional wireless terminal (STA) positioning method. As shown in FIG. 1, the positioning method is introduced as follows: an STA first sends a positioning request message to an access point AP1, receives a measurement message returned by AP1, and possibly performs more message exchanges, aiming to obtain a transmission time T1 of a message between the STA and AP1; after completing message exchanges with AP1, the STA switches a channel and sends a positioning request message to AP2, and performs an exchange with AP2 to obtain a transmission time T2 of a message between the STA and AP2; after completing the message exchange with AP2, the STA switches a channel again and sends a positioning request message to AP3, and performs an exchange with AP3 to obtain a transmission time T3 of a message between the STA and AP3; ... ; the rest may be deduced by analogy, and after the STA completes message exchanges with at least three APs, the STA may send T1, T2, T3 ... to a location server, and the location server may be configured with a reference point database used to record a wireless transmission time between each sampled STA location and each AP, and therefore, the location server determines, according to T1, T2, T3 ... sent by the STA, an STA location in the reference point database and notifies the STA, thereby realizing the positioning of the STA. The location server may also calculate the location of the STA through a triangulation positioning method after obtaining time information. The AP may also collect power information of the STA sending a location measurement message, and estimate the location of the STA by using signal intensity.

In the foregoing STA positioning method, the STA needs to perform a message exchange with each AP one by one, and sends a message in a contention-based manner. When the number of APs requiring exchanges is large and the number of subscribers is large, a long time is required for completing STA positioning once, and a large number of message exchanges consume more power of the STA.

SUMMARY OF THE INVENTION

Embodiments of the present invention provide a method for positioning a wireless terminal, and a related device and system, which are capable of shortening positioning time of the wireless terminal and reducing power consumption.

A method for positioning a wireless terminal includes:

obtaining, by the wireless terminal, a positioning service period and an identifier of a positioning channel from a first access point;

switching, by the wireless terminal, to the positioning channel in the positioning service period; and broadcasting, by the wireless terminal, a location measurement message through the positioning channel, so that at least three access points in an access point group where the first access point is located obtain positioning measurement data after receiving the location measurement message, so as to estimate a location of the wireless terminal.

A method for positioning a wireless terminal includes:

obtaining, by a first access point, a positioning service period from a location server;

sending, by the first access point, the positioning service period and an identifier of a positioning channel to the wireless terminal, so that the wireless terminal switches to the positioning channel in the positioning service period, and broadcasts a location measurement message through the positioning channel;

switching, by at least three access points in an access point group where the first access point is located, to the positioning channel in the positioning service period, and receiving, through the positioning channel, the location measurement message broadcast by the wireless terminal; and obtaining, by the at least three access points, positioning measurement data after receiving the location measurement message, so as to estimate a location of the wireless terminal.

A method for positioning a wireless terminal includes:

receiving, by a location server, a positioning service period request message sent by a first access point;

sending, by the location server, a positioning service period to all access points in an access point group where the first access point is located, so that at least three access points in the access point group switch to a positioning channel in the positioning service period, receive a location measurement message broadcast by the wireless terminal through the positioning channel, and after receiving the location measurement message, obtain positioning measurement data and send the positioning measurement data to the location server; and estimating, by the location server, a location of the wireless terminal according to the positioning measurement data sent by the at least three access points.

A wireless terminal includes:

an obtaining unit, configured to obtain a positioning service period and an identifier of a positioning channel from a first access point;

a switching unit, configured to switch to the positioning channel in the positioning service period; and a broadcast unit, configured to broadcast a location measurement message through the positioning channel, so that at least three access points in an access point group where the first access point is located obtain positioning measurement data after receiving the location measurement message, so as to estimate a location of the wireless terminal.

An access point includes:

an obtaining unit, configured to obtain a positioning service period from a location server;

a transceiver unit, configured to send the positioning service period and an identifier of a positioning channel to a wireless terminal, so that the wireless terminal switches to the positioning channel in the positioning service period, and broadcasts a location measurement message through the positioning channel;

a switching unit, configured to switch to the positioning channel in the positioning service period;

where the transceiver unit is further configured to receive, through the positioning channel, the location measurement message broadcast by the wireless terminal; and a control unit, configured to, after the transceiver unit receives the location measurement message, obtain positioning measurement data and send the positioning measurement data to the location server, where the location server estimates a location of the wireless terminal according to the positioning measurement data sent by at least three access points in an access point group where the access point is located.

A location server includes:

a receiving unit, configured to receive a positioning service period request message sent by a first access point;

an allocation unit, configured to send a positioning service period to all access points in an access point group where the first access point is located, so that at least three access points in the access point group switch to a positioning channel in the positioning service period, receive a location measurement message broadcast by a wireless terminal through the positioning channel, and after receiving the location measurement message, obtain positioning measurement data and send the positioning measurement data to the location server; and a positioning unit, configured to estimate a location of the wireless terminal according to the positioning measurement data sent by the at least three access points.

A system for positioning a wireless terminal includes a wireless terminal, an access point group including at least three access points, and a location server, where:

the wireless terminal is configured to obtain a positioning service period and an identifier of a positioning channel from a first access point in the access point group, switch to a positioning channel in the positioning service period, and broadcast a location measurement message through the positioning channel;

the first access point is configured to obtain the positioning service period from the location server, send the positioning service period and the identifier of the positioning channel to the wireless terminal, switch to the positioning channel in the positioning service period, receive, through the positioning channel, a location measurement message broadcast by the wireless terminal through the positioning channel, and after receiving the location measurement message, obtain positioning measurement data and send the positioning measurement data to the location server;

other access points in the access point group except the first access point are configured to obtain the positioning service period from the location server, switch to the positioning channel in the positioning service period, receive, through the positioning channel, the location measurement message broadcast by the wireless terminal through the positioning channel, and after receiving the location measurement message, obtain positioning measurement data and send the positioning measurement data to the location server; and the location server is configured to send the positioning service period to all the access points in the access point group, and receive the positioning measurement data sent by the at least three access points in the access point group so as to estimate location information of the wireless terminal.

In the foregoing solution, the wireless terminal switches to the positioning channel in the positioning service period and broadcasts the location measurement message through the positioning channel, so as to implement the positioning of the wireless terminal. Compared with the prior art, the wireless terminal in the embodiment of the present invention does not need to perform a message exchange with every access point one by one to implement the positioning, and is not affected by the number of access points, thereby shortening the positioning time. Moreover, in the embodiment of the present invention, because of less message exchanges, the power consumption of the wireless terminal may be greatly saved. Therefore, in conclusion, the embodiment of the present invention can shorten the positioning time of the wireless terminal and reduce the power consumption.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

The embodiments of the present invention provide a method for positioning a wireless terminal, and a related device and system, which are used to implement wireless terminal positioning, and capable of shortening positioning time of the wireless terminal and reducing the power consumption. The embodiments are illustrated in detail.

Embodiment 1

Figure 1:
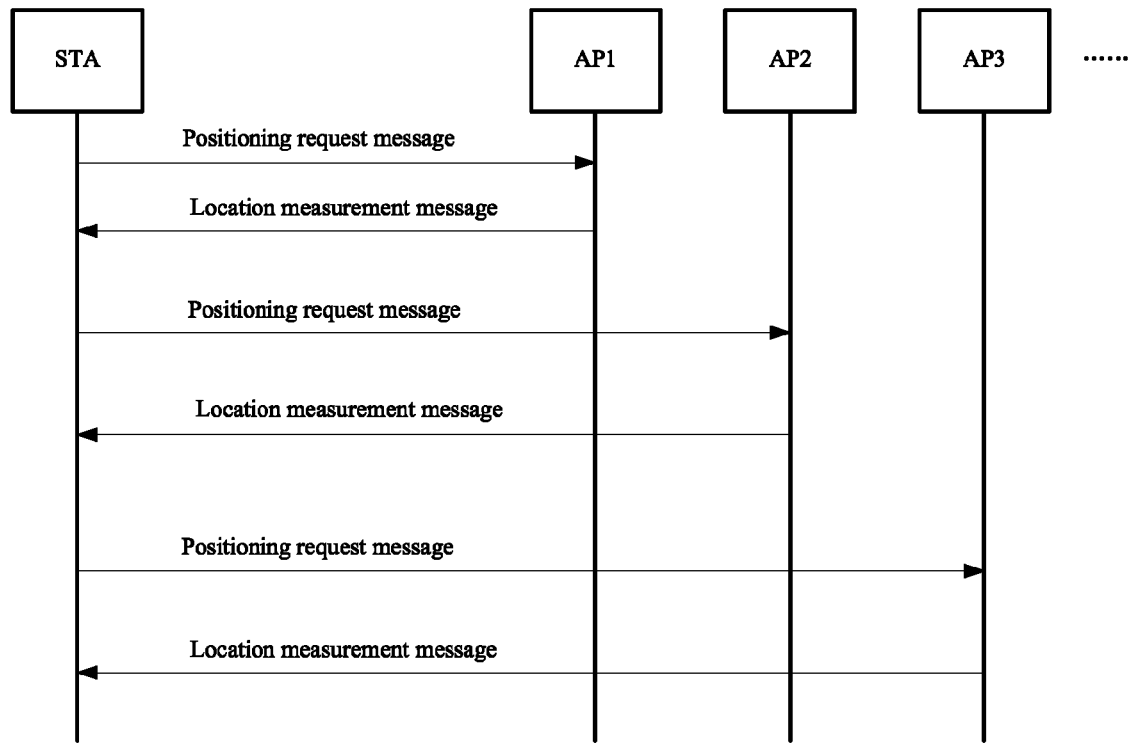
FIG. 1 is a flow chart of a conventional method for positioning a wireless terminal.
Figure 2:
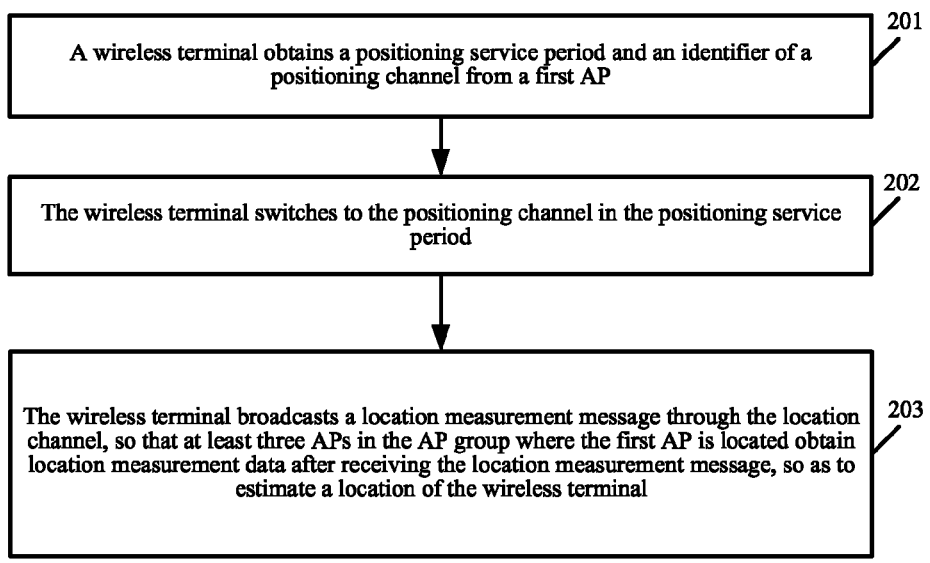
FIG. 2 to FIG. 8 are flow charts of several methods for positioning a wireless terminal according to embodiments of the present invention.

Referring to FIG. 2, FIG. 2 is a flow chart of a method for positioning a wireless terminal according to Embodiment 1 of the present invention. In Embodiment 1 of the present invention, the method for positioning a wireless terminal provided in the embodiment of the present invention is described from the perspective of a wireless terminal. As shown in FIG. 2, the method may include the following steps:

201: The wireless terminal obtains a positioning service period and an identifier of a positioning channel from a first AP.

As an optional implementation, the wireless terminal may monitor a beacon frame of the first AP, and obtain the identifier of the positioning channel, where the identifier is included in the beacon frame; send a positioning request message to the first AP, receive a positioning response message sent by the first AP, and obtain the positioning service period included in the positioning response message. Therefore, the wireless terminal may obtain the identifier of the positioning channel and the positioning service period from the beacon frame and the positioning response message, respectively.

As another optional implementation, the positioning service period may be provided in a manner of a start time, service period duration, and an interval cycle of the positioning service period, and may also be provided in a manner of a start time, an end time, and an interval cycle of the positioning service period, and so on.

As another optional implementation, the wireless terminal may send a probe request message to the first AP, and receive a probe response message sent by the first AP, where the probe response message includes the positioning service period and the identifier of the positioning channel. Therefore, the wireless terminal may obtain the identifier of the positioning channel and the positioning service period from the probe response message. Optionally, the probe request message may include indication information indicating that the wireless terminal requires positioning, that is, positioning request information.

As still another optional implementation, the wireless terminal may sent a positioning request message to the first AP, and receive a positioning response message sent by the first AP, where the positioning response message includes the positioning service period and the identifier of the positioning channel. Therefore, the wireless terminal may obtain the identifier of the positioning channel and the positioning service period from the positioning response message.

202. The wireless terminal switches to the positioning channel in the positioning service period.

As still another optional implementation, the wireless terminal may switch to the positioning channel at a start time of the positioning service period, or switch to the positioning channel at a random time point between a start time and an end time of the positioning service period.

The objective of the wireless terminal switching to the positioning channel is broadcasting a location measurement message on the positioning channel.

As a specific implementation, the positioning service period is a dedicated positioning time period for the wireless terminal, the wireless terminal may switch to the positioning channel when timing reaches a start time of the positioning service period (if an AP connected to the wireless terminal works on the positioning channel, the wireless terminal also works on the positioning channel, so the wireless terminal does not need to switch the channel). This is a contention-free manner of sending a positioning measurement message, and each wireless terminal requesting positioning will get its dedicated positioning service period.

As another specific implementation, the positioning service period is a public positioning time period in a system formed by an AP group where the first AP is located, and the wireless terminal may switch to the positioning channel at any time point between a start time of the positioning service period and an end time of the positioning service period. This is a contention-based manner of sending a positioning measurement message, and each wireless terminal requesting positioning sends the positioning measurement message in this period of time in a contention manner. Specifically, the wireless terminal randomly generates a time value between the start time and the end time of the positioning service period, and for the time point, it should be taken into consideration that the sending of the positioning measurement message can be completed before the end time of the positioning service period arrives. The wireless terminal switches to the positioning channel when reaching the randomly generated time point, and sends the positioning measurement message. Because a contention mechanism is adopted, it is possible that a positioning measurement message sent by one wireless terminal has conflict with a positioning measurement message sent by another wireless terminal, resulting in positioning failure of the two wireless terminals this time. The wireless terminal ignores whether this time of positioning fails, as long as a positioning cycle, that is, an interval cycle of the positioning service period is not too long, and the positioning service period is sufficient for the number of wireless terminals, such conflict will not happen frequently, and a few positioning failures will not affect use of a positioning function, but may reduce scheduling on a positioning period. Moreover, wireless terminals at different locations, if a distance between them is far enough, may send positioning measurement messages at the same time without any conflict, which also takes full advantage of a positioning measurement period. Therefore, a contention-free mechanism and a contention-based mechanism both have their respective advantages on broadcasting a positioning measurement message on the public positioning channel, which are not limited in the present invention.

203: The wireless terminal broadcasts the location measurement message through the positioning channel, so that at least three APs in the AP group where the first AP is located obtain positioning measurement data after receiving the location measurement message, so as to estimate a location of the wireless terminal.

As an optional implementation, after each obtaining the positioning measurement data, the at least three APs may send the positioning measurement data to the location server, where the location server estimates the location of the wireless terminal according to the positioning measurement data; or, after each obtaining the positioning measurement data, the at least three APs send the positioning measurement data to the wireless terminal through an AP currently connected to the wireless terminal, so that the wireless terminal estimates its own location.

In an embodiment, that after receiving the location measurement message, the at least three APs obtain the positioning measurement data and send the positioning measurement data to the location server, where the location server estimates location information of the wireless terminal according to the positioning measurement data sent by each AP may be specifically that:

the at least three APs each record a time T2 of receiving the location measurement message, and send the time T2 to the location server, where the location server estimates the location information of the wireless terminal according to T2 sent by each AP and location information of each AP; where, all APs in the AP group are synchronized in time.

In an embodiment, the wireless terminal is synchronized in time with all the APs in the AP group, and the location measurement message includes a time T1 at which the wireless terminal sends the location measurement message; and therefore, that after receiving the location measurement message, the at least three APs obtain the positioning measurement data and send the positioning measurement data to the location server, where the location server estimates the location information of the wireless terminal according to the positioning measurement data sent by each AP may be specifically that:

the at least three APs each record a time T2 of receiving the location measurement message, and send the time T2 and the time T1 to the location server, where the time T1 is the time at which the wireless terminal sends the location measurement message and is included in the location measurement message, where the location server estimates the location information of the wireless terminal according to T2 and T1 sent by each AP and location information of each AP;

or, the at least three APs each record a time T2 of receiving the location measurement message, and send a difference between T2 and the time T1 to the location server, where the location server estimates the location information of the wireless terminal according to the difference between T2 and T1 sent by each AP and location information of each AP.

In an embodiment, that the wireless terminal broadcasts the location measurement message through the positioning channel in the step 203 may specifically be that: the wireless terminal broadcasts the location measurement message through the positioning channel by using specified transmission power; then correspondingly, that after receiving the location measurement message, the at least three APs obtain the positioning measurement data and send the positioning measurement data to the location server, where the location server estimates the location information of the wireless terminal according to the positioning measurement data sent by each AP may be specifically that:

the at least three APs each measure receiving power for receiving the location measurement message, and send the receiving power to the location server, where the server estimates the location information of the wireless terminal according to the receiving power sent by each access point, the specified transmission power stored in the location server, and location information of each AP. The server may pre-store the specified transmission power used by the wireless terminal to broadcast the location measurement message.

In an embodiment, in the step 203, the location measurement message broadcast by the wireless terminal may include specified transmission power that is used when the wireless terminal sends the location measurement message; then correspondingly, that after receiving the location measurement message, the at least three APs obtain the positioning measurement data and send the positioning measurement data to the location server, where the location server estimates the location information of the wireless terminal according to the positioning measurement data sent by each AP may be specifically that:

the at least three APs each measure receiving power for receiving the location measurement message, and send the receiving power and the specified transmission power to the location server, where the server estimates the location information of the wireless terminal according to the specified transmission power and receiving power sent by each AP and location information of each AP.

n the embodiment of the present invention, location measurement messages received by the at least three APs each are the same location measurement message sent by the wireless terminal at the same moment, or, are multiple location measurement messages sent by the wireless terminal at the same moment, which is not limited in the embodiment of the present invention.

In the embodiment of the present invention, the location information of each AP may be an identifier, coordinate information and the like of each AP, which is not limited in the embodiment of the present invention.

In the embodiment of the present invention, the at least three APs may include the first AP, and may also not include the first AP, which is not limited in the embodiment of the present invention. The first AP may refer to an AP of a serving cell where the wireless terminal is located when the wireless terminal accesses a network, and may also be an AP currently connected to the wireless terminal. The wireless terminal, when accessing the network, may obtain the required positioning service period and positioning channel through a beacon frame or a detection response frame, and may also obtain the positioning service period and positioning channel by sending a positioning request message when the wireless terminal requires positioning after switching to any AP after accessing the network. During actual positioning, because the wireless terminal is moving, the AP capable of monitoring the location measurement message of the wireless terminal changes.

In the embodiment of the present invention, the location server may be pre-configured on any AP in the AP group, and may also be served as an independent core network device, which is not limited in the embodiment of the present invention. The identifier of the positioning channel may be pre-configured on the AP, or may be allocated by the location server to the AP, which is also not limited in the present invention.

In Embodiment 1 of the present invention, the wireless terminal switches to the positioning channel in the positioning service period, and broadcasts the location measurement message through the positioning channel, so that the at least three APs obtain the positioning measurement data after receiving the location measurement message, so as to estimate the location information of the wireless terminal. In Embodiment 1 of the present invention, the wireless terminal does not need to perform a message exchange with each AP one by one, and is not affected by the number of access points, thereby shortening positioning time. Moreover, in Embodiment 1 of the present invention, because of less message exchanges, the power consumption of the wireless terminal may be greatly saved.

Embodiment 2

Figure 3:
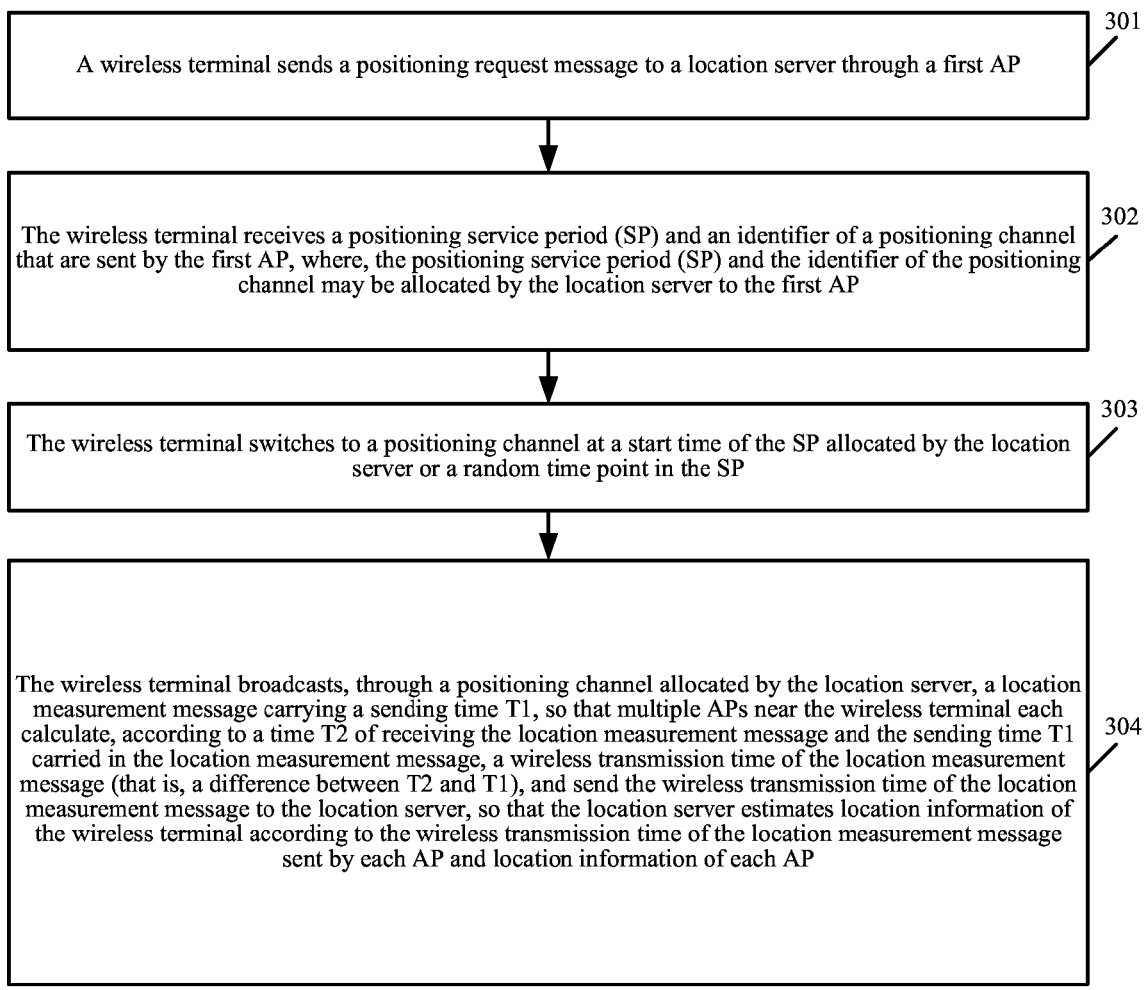

Referring to FIG. 3, FIG. 3 is a flow chart of a method for positioning a wireless terminal according to Embodiment 2 of the present invention. In Embodiment 2 of the present invention, the method for positioning a wireless terminal provided in the embodiment of the present invention is also described from the perspective of a wireless terminal. As shown in FIG. 3, the method may include the following steps:

301: The wireless terminal sends a positioning request message to a location server through a first AP.

In the embodiment of the present invention, the first AP may be a serving access point of an area where the wireless terminal is currently located.

In the embodiment of the present invention, the wireless terminal may also be referred to as a terminal (terminal), a mobile station (mobile station), a subscriber unit (subscriber unit), a station (station), and so on. The wireless terminal may specifically be a cellular phone (cellular phone), a personal digital assistant (Personal Digital Assistant, PDA), a wireless modem (modem), a wireless communication device, a handset (handset), a laptop computer (laptop computer), a cordless phone (cordless phone), a wireless local loop (Wireless Local Loop, WLL) station, and so on. The AP may be a home base station, a pico (pico) base station, a femto (femto) cellular base station, and so on.

302: The wireless terminal receives a positioning service period (SP) and an identifier of a positioning channel that are sent by the first AP, where, the positioning service period (SP) and the identifier of the positioning channel may be allocated by the location server to the first AP.

In the embodiment of the present invention, the identifier of the positioning channel is used to identify one positioning channel. A positioning channel allocated by the location server may be any one of channels in the 802.11 standard, for example, one of 13 channels of a 2.4 GHz spectrum, which is not limited in the embodiment of the present invention.

303: The wireless terminal switches its channel to the positioning channel at a start time of the SP allocated by the location server or a random time point in the SP.

In an embodiment, after receiving the SP and identifier of the positioning channel that are allocated by the location server and sent by the first AP, the wireless terminal may start timing immediately, and switch its channel to the positioning channel when the timing reaches the start time of the SP. The positioning channel allocated by the location server is dedicated to perform wireless terminal positioning. It can be understood that, the channel switching of the wireless terminal when the timing reaches the start time of the SP allocated by the location server should have a timing advance, because channel switching takes some time, and the wireless terminal may not be strictly synchronized with the time of each AP. Therefore, at the start time of the SP (that is, when the SP starts), the wireless terminal should have switched to the positioning channel.

In another embodiment, after receiving the SP and identifier of the positioning channel that are allocated by the location server and sent by the first AP, the wireless terminal may generate a random number, the random number being a time point in a time range of the SP, and switch its channel to the positioning channel when the timing reaches the random time point. The positioning channel allocated by the location server is dedicated to perform wireless terminal positioning. It can be understood that, the random time point should ensure that the wireless terminal can complete sending of a location measurement message before the SP ends.

304: The wireless terminal broadcasts, through the positioning channel allocated by the location server, a location measurement message carrying a sending time T1, and multiple APs near the wireless terminal each calculate, according to a time T2 of receiving the location measurement message and the sending time T1 carried in the location measurement message, a wireless transmission time of the location measurement message (that is, a difference between T2 and T1), and send the wireless transmission time of the location measurement message to the location server, where the location server estimates location information of the wireless terminal the wireless transmission time of the location measurement message sent by each AP and location information of each AP.

The multiple APs may include or not include the first AP, because after obtaining the positioning service period and identifier of the positioning channel from the first AP, the wireless terminal may move beyond a signal coverage range of the first AP, and at this time, the first AP cannot receive a signal of the wireless terminal, but other APs in the same AP group as the first AP may receive the signal of the wireless terminal. Generally, as long as any other three APs that are not located in the same straight line and receive the location measurement message of the wireless terminal exist, positioning on a plane may be performed, and the participation of the first AP is unnecessary.

In the embodiment of the present invention, wireless transmission times of the location measurement message received by the at least three APs refers to a transmission time of the location measurement message between the wireless terminal and each AP, where the location measurement message is broadcast by the wireless terminal.

Generally, after the location server receives the positioning measurement data (that is, the difference between T2 and T1) sent by each AP, if a time-based positioning method is used, the location information of the wireless terminal may be estimated in the following two manners. One manner is that the location server determines the location information of the wireless terminal through a reference point database, and the other manner is that the location server estimates the location information of the wireless terminal through a mathematical formula. The two manners are illustrated in detail in combination with specific embodiments in subsequent embodiments of the present invention.

As an optional implementation, in the embodiment of the present invention, the wireless terminal may further receive a positioning period that is allocated by the location server and sent by the first AP, where the positioning period includes at least one SP. Correspondingly, after broadcasting, through the positioning channel, the location measurement message carrying the sending time T1, if the positioning period ends, the wireless terminal may switch the positioning channel to a working channel of the wireless terminal, thereby restoring a service operation of the wireless terminal.

As an optional implementation, in the embodiment of the present invention, the wireless terminal may further receive the location information of the wireless terminal that is estimated by the location server and sent by the first AP, and display the location information of the wireless terminal, so that a subscriber may know a location of the subscriber in real time.

In Embodiment 2 of the present invention, after the timing reaches the start time of the SP allocated by the location server, the wireless terminal may switch its channel to the positioning channel allocated by the location server, and broadcast, through the positioning channel, the location measurement message carrying the sending time T1, so as to implement location. Compared with the prior art, in Embodiment 2 of the present invention, the wireless terminal does not need to perform a message exchange with each AP one by one to implement location, and is not affected by the number of APs, thereby shortening positioning time. Moreover, in Embodiment 2 of the present invention, because of less message exchanges, the power consumption of the wireless terminal may be greatly saved.

Embodiment 3

Figure 4:
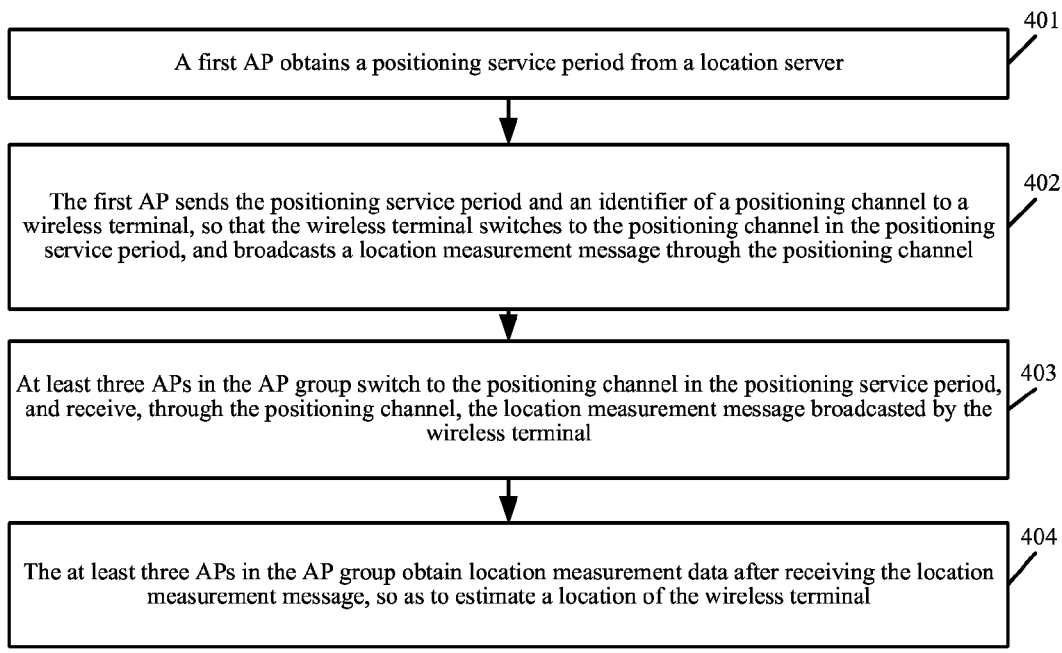

Referring to FIG. 4, FIG. 4 is a flow chart of a method for positioning a wireless terminal according to Embodiment 3 of the present invention. The positioning method includes one AP group, and the AP group includes at least three APs. In Embodiment 3 of the present invention, the method for positioning a wireless terminal provided in the embodiment of the present invention is described from the perspective of the AP group. As shown in FIG. 4, the method may include the following steps:

401: A first AP obtains a positioning service period from a location server.

As an optional implementation, the first AP may receive a probe request message that includes positioning request information and is sent by the wireless terminal, send a positioning request message to the location server, and receive the positioning service period allocated by the location server.

As another optional implementation, the first AP may receive a positioning request message sent by the wireless terminal, send the positioning request message to the location server, and receive the positioning service period allocated by the location server.

402: The first AP sends the positioning service period and an identifier of a positioning channel to the wireless terminal, so that the wireless terminal switches to the positioning channel in the positioning service period, and broadcasts a location measurement message through the positioning channel.

The identifier of the positioning channel may be pre-configured on the first AP, and may also be allocated by the location server to the first AP, which is not limited in the embodiment of the present invention. For example, the location server may send the identifier of the positioning channel and the positioning service period together to the first AP after receiving the positioning request message sent by the first AP.

It should be noted that, at the same time when the positioning service period is allocated to the wireless terminal, the positioning service period is also sent to other APs in the AP group where the first AP is located.

403: At least three APs in the AP group switch to the positioning channel in the positioning service period, and receive, through the positioning channel, the location measurement message broadcast by the wireless terminal.

The switching to the positioning channel when the timing reaches a start time of the positioning service period refers to that an AP has switched to the positioning channel when the timing reaches the start time of the positioning service period, on one hand, a switch process needs some time, so the AP should perform switch a little earlier, and on the other hand, in consideration that a clock of the AP is not necessarily absolutely synchronized with a clock of the wireless terminal, so the AP needs to switch to the positioning channel a period of time earlier. Moreover, the AP provides a positioning measurement service for not only one wireless terminal, and it is possible that a positioning service period of another wireless terminal and the positioning service period of the wireless terminal are successive and the positioning service period of another wireless terminal is before the wireless terminal, so as for the wireless terminal, the AP has switched to the positioning channel when the timing reaches the positioning service period.

It should be noted that, other APs in the AP group also switch to the positioning channel at the same time.

404: The at least three APs in the AP group obtain positioning measurement data after receiving the location measurement message, so as to estimate a location of the wireless terminal.

In an embodiment, after receiving the location measurement message and obtaining the positioning measurement data, the at least three APs in the AP group may send the positioning measurement data to the location server, where the location server estimates location information of the wireless terminal according to the positioning measurement data sent by the at least three APs (which may include the first AP, and may not include the first AP). Alternatively, after receiving the location measurement message and obtaining the positioning measurement data, the at least three APs in the AP group may send the positioning measurement data to the wireless terminal through an AP currently connected to the wireless terminal, so that the wireless terminal estimates its own location.

In an embodiment, that after receiving the location measurement message, the at least three APs obtain the positioning measurement data and send the positioning measurement data to the location server, where the location server estimates the location information of the wireless terminal according to the positioning measurement data sent by the at least three APs may specifically be that:

after receiving the location measurement message, the at least three APs record times T2 of receiving the location measurement message, and send the times T2 to the location server, where the location server estimates the location information of the wireless terminal according to the times T2 sent by the at least three APs and location information of each AP; where all APs in the AP group are synchronized in time.

In an embodiment, the wireless terminal is synchronized in time with all APs in the AP group, and the location measurement message sent by the wireless terminal may include a time T1 at which the wireless terminal sends the location measurement message; then, correspondingly, that after receiving the location measurement message, the at least three APs obtain the positioning measurement data and send the positioning measurement data to the location server, where the location server estimates the location information of the wireless terminal according to the positioning measurement data sent by the at least three APs may specifically be that:

after receiving the location measurement message, the at least three APs record respective times T2 of receiving the location measurement message, and send the respective times T2 of receiving the location measurement message and the time T1 to the location server, where the location server estimates the location information of the wireless terminal according to T2 and T1 sent by the at least three APs each and location information of the at least three APs;

or, after receiving the location measurement message, the at least three APs record respective times T2 of receiving the location measurement message, and send differences between the respective times T2 of receiving the location measurement message and the time T1 to the location server, where the location server estimates the location information of the wireless terminal according to a difference that is between T2 and the time T1 and sent by the at least three APs each, and location information of the at least three Ps.

In an embodiment, that the wireless terminal broadcasts the location measurement message through the positioning channel may specifically be that: the wireless terminal broadcasts the location measurement message through the positioning channel by using specified transmission power; then, correspondingly, that after receiving the location measurement message, the at least three APs obtain the positioning measurement data and send the positioning measurement data to the location server, where the location server estimates the location information of the wireless terminal according to the positioning measurement data sent by the at least three APs may specifically be that:

after receiving the location measurement message, the at least three APs measure receiving power for receiving the location measurement message, and send the receiving power to the location server, where the server estimates the location information of the wireless terminal according to the receiving power sent by the at least three APs, the specified transmission power stored in the location server, and location information of each AP.

In an embodiment, the location measurement message broadcast by the wireless terminal may include specified transmission power that is used when the wireless terminal sends the location measurement message; then correspondingly, that after receiving the location measurement message, the at least three APs obtain the positioning measurement data and send the positioning measurement data to the location server, where the location server estimates the location information of the wireless terminal according to the positioning measurement data sent by the at least three APs may specifically be that:

after receiving the location measurement message, the at least three APs measure receiving power for receiving the location measurement message, and send the receiving power and the specified transmission power to the location server, where the location server estimates the location information of the wireless terminal according to the specified transmission power and receiving power sent by the at least three and location information of each AP.

In Embodiment 3 of the present invention, the wireless terminal switches to the positioning channel after the timing reaches the start time of the positioning service period, and broadcasts the location measurement message through the positioning channel, the at least three APs obtain the positioning measurement data after receiving the location measurement message and send the positioning measurement data to the location server, where the location server estimates the location information of the wireless terminal according to the positioning measurement data sent by each AP. In Embodiment 3 of the present invention, the wireless terminal does not need to perform a message exchange with each AP one by one, and is not affected by the number of access points, thereby shortening positioning time. Moreover, in Embodiment 3 of the present invention, because of less message exchanges, the power consumption of the wireless terminal may be greatly saved.

Embodiment 4

Figure 5:
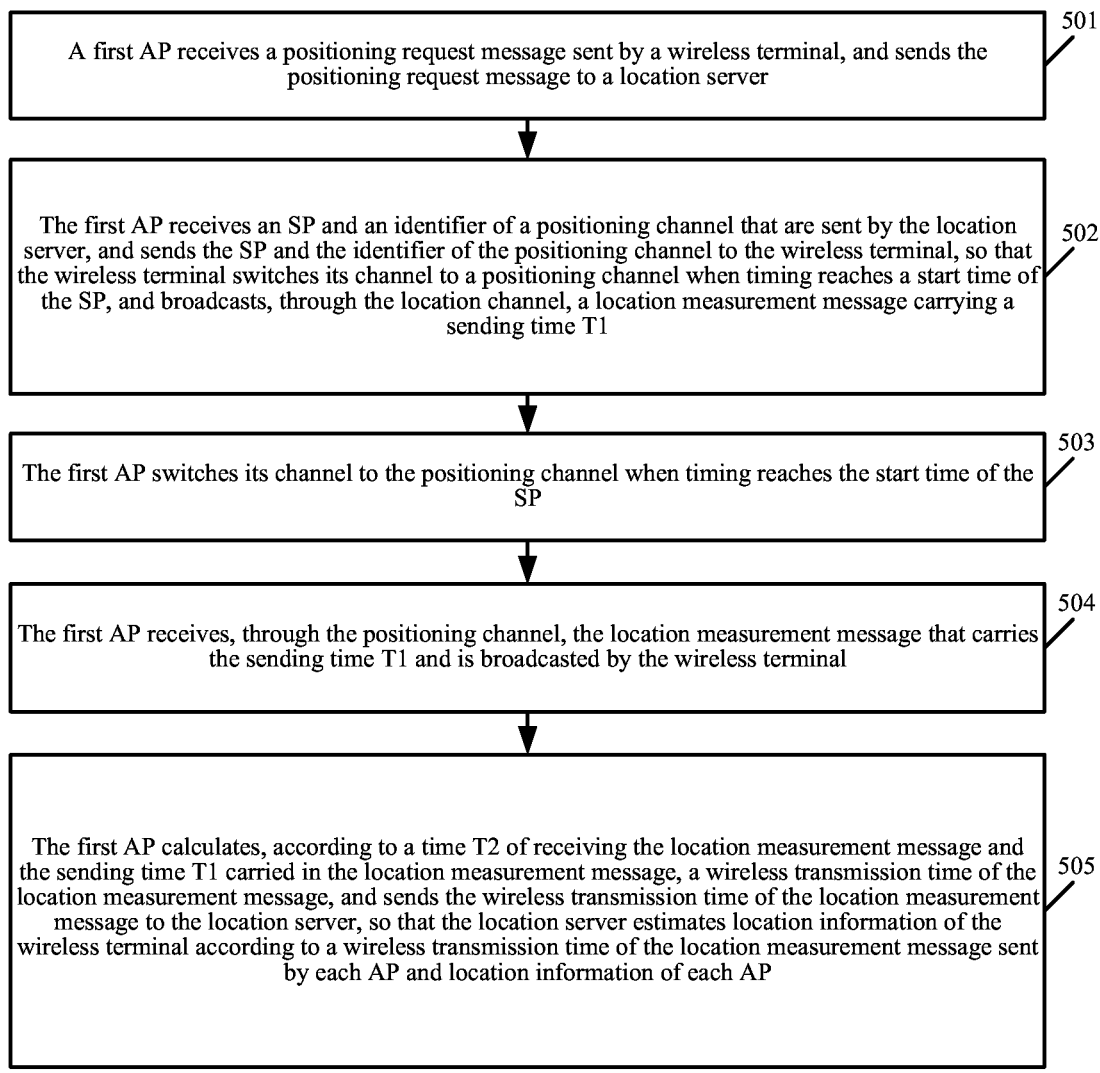

Referring to FIG. 5, FIG. 5 is a flow chart of a method for positioning a wireless terminal according to Embodiment 4 of the present invention. In Embodiment 4 of the present invention, the method for positioning a wireless terminal provided in the embodiment of the present invention is described from the perspective of an AP group. As shown in FIG. 5, the method may include the following steps:

501: A first AP receives a positioning request message sent by the wireless terminal, and sends the positioning request message to a location server.

In the embodiment of the present invention, the first AP, serving as a serving access point of an area where the wireless terminal currently is located, may forward the positioning request message to the location server after receiving the positioning request message sent by the wireless terminal.

502: The first AP receives an SP and an identifier of a positioning channel that are sent by the location server, and sends the SP and the identifier of the positioning channel to the wireless terminal, so that the wireless terminal switches its channel to the positioning channel when timing reaches a start time of the SP, and broadcasts, through the positioning channel, a location measurement message carrying a sending time T1.

In an embodiment of the present invention, at least three APs in the AP where the first AP is located receive the SP and the identifier of the positioning channel that are allocated by the location server.

503: The first AP switches its channel to the positioning channel when timing reaches the start time of the SP.

In an embodiment, after receiving the SP and the identifier of the positioning channel that are allocated by the location server, at least three APs including the first AP may start timing immediately, and switch their respective channels to the positioning channel when the timing reaches the start time of the SP.

504: The first AP receives, through the positioning channel, the location measurement message that carries the sending time T1 and is broadcast by the wireless terminal.

In an embodiment of the present invention, at least three APs including the first AP switch channels to the positioning channel when the timing reaches the start time of the SP, and receive, through the positioning channel, the location measurement message that carries the sending time T1 and is broadcast by the wireless terminal.

505: The first AP calculates, according to a time T2 of receiving the location measurement message and the sending time T1 carried in the location measurement message, a wireless transmission time of the location measurement message (that is, a difference between T2 and T1), and sends the wireless transmission time of the location measurement message to the location server, so that the location server estimates location information of the wireless terminal according to a wireless transmission time of the location measurement message sent by each AP and location information of each AP.

As an optional implementation, in an embodiment of the present invention, the first AP may further receive a positioning period allocated by the location server, and send the positioning period to the wireless terminal; where the positioning period includes at least one SP. Correspondingly, after the first AP sends the calculated wireless transmission time of the location measurement message to the location server, if the positioning period ends, the first AP may switch the positioning channel to a working channel of the first AP, thereby restoring a service operation of the first AP.

Correspondingly, other APs, other than the first AP, may also receive the positioning period allocated by the location server. Correspondingly, after the other APs send the calculated wireless transmission time of the location measurement message to the location server, if the positioning period ends, the other APs may also switch the positioning channel to their respective working channels, thereby restoring service operations of the other APs.

As an optional implementation, in an embodiment of the present invention, the first AP, serving as a serving access point of an area where the wireless terminal currently is located, may further receive the location information of the wireless terminal estimated by the location server, and send the location information of the wireless terminal to the wireless terminal for display, so that a subscriber may know a location of the subscriber in real time.

In Embodiment 4 of the present invention, when the timing reaches the start time point of the SP allocated by the location server, the at least three APs including the first AP may switch their respective channels to the positioning channel allocated by the location server, receive, through the positioning channel, the location measurement message that carries the sending time T1 and is broadcast by the wireless terminal through a positioning signal, calculate wireless transmission times of the location measurement message (that is, differences between T2 and T1) according to times T2 of receiving the location measurement message and the sending time T1 carried in the location measurement message, and send the wireless transmission times of the location measurement message to the location server, so that the location server estimates the location information of the wireless terminal. Embodiment 4 of the present invention may shorten positioning time of the wireless terminal; and because of less message exchanges, the power consumption of the wireless terminal may be greatly saved.

Embodiment 5

Figure 6:
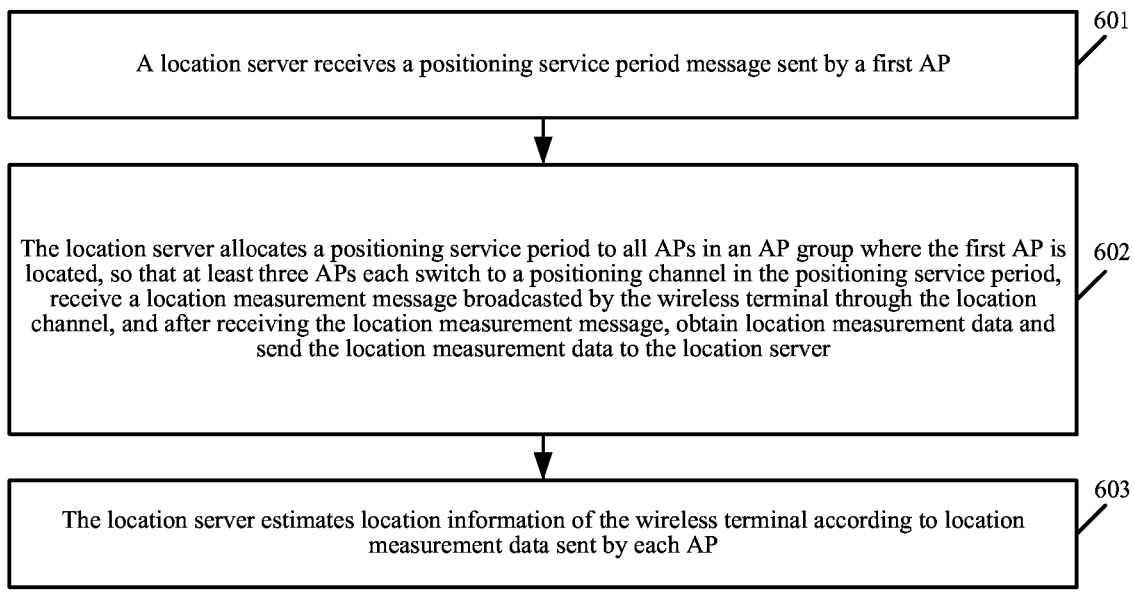

Referring to FIG. 6, FIG. 6 is a flow chart of a method for positioning a wireless terminal according to Embodiment 5 of the present invention. In Embodiment 5 of the present invention, the method for positioning a wireless terminal provided in the embodiment of the present invention is described from the perspective of a location server. As shown in FIG. 6, the method may include the following steps:

601: The location server receives a positioning service period message sent by a first AP.

602: The location server allocates a positioning service period to all APs in an AP group where the first AP is located, so that at least three APs each switch to a positioning channel in the positioning service period, receive a location measurement message broadcast by the wireless terminal through the positioning channel, and after receiving the location measurement message, obtain positioning measurement data and send the positioning measurement data to the location server.

603: The location server estimates location information of the wireless terminal according to the positioning measurement data sent by the at least three APs.

In an embodiment of the present invention, the first AP may send the positioning service period and an identifier of a positioning channel to the wireless terminal, so that the wireless terminal switches to the positioning channel when timing reaches a start time of the positioning service period, and broadcasts the location measurement message through the positioning channel.

The identifier of the positioning channel may be pre-configured on the first AP, and may also be allocated by the location server to the first AP. For example, the location server may allocate the identifier of the positioning channel and the positioning service period together to the first AP after receiving a positioning request message sent by the first AP.

In an embodiment of the present invention, the location server may be pre-configured on any AP in the AP group where the first AP is located.

In an embodiment, that after receiving the location measurement message, the at least three APs obtain the positioning measurement data and send the positioning measurement data to the location server in the step 602 may specifically be that: after receiving the location measurement message, the at least three APs each record a time T2 of receiving the location measurement message, and send the time T2 to the location server. Correspondingly, that the location server estimates the location information of the wireless terminal according to the positioning measurement data sent by the at least three APs in step 603 may specifically be that: the location server estimates the location information of the wireless terminal according to times T2 sent by the at least three APs and location information of each AP; where, the APs are synchronized in time.

In an embodiment, the wireless terminal is synchronized in time with the APs, and the location measurement message includes a time T1 at which the wireless terminal sends the location measurement message; then, correspondingly, that after receiving the location measurement message, the at least three APs obtain the positioning measurement data and send the positioning measurement data to the location server in the step 602 may specifically be that: after receiving the location measurement message, the at least three APs each record a time T2 of receiving the location measurement message, and send T2 and the time T1 to the location server; or, after receiving the location measurement message, the at least three APs each record a time T2 of receiving the location measurement message, and send a difference between T2 and the time T1 to the location server. Correspondingly, that the location server estimates the location information of the wireless terminal according to the positioning measurement data sent by the at least three APs in step 603 may specifically be that: the location server estimates the location information of the wireless terminal according to T2 and T1 sent by the at least three APs and location information of each AP; or, the location server estimates the location information of the wireless terminal according to differences that are between T2 and the time T1 and sent by the at least three APs, and location information of each AP.

In an embodiment, a specific manner of the wireless terminal broadcasting the location measurement message through the positioning channel is that: the wireless terminal broadcasts the location measurement message through the positioning channel by using specified transmission power; then, correspondingly, that after receiving the location measurement message, the at least three APs obtain the positioning measurement data and send the positioning measurement data to the location server in the step 602 may specifically be that: after receiving the location measurement message, the at least three APs measure receiving power for receiving the location measurement message, and send the receiving power to the location server; correspondingly, that the location server estimates the location information of the wireless terminal according to the positioning measurement data sent by the at least three APs in step 603 may specifically be that: the location server estimates the location information of the wireless terminal according to the receiving power sent by the at least three APs, the specified transmission power stored in the location server, and location information of each AP.

In an embodiment, the location measurement message may include specified transmission power that is used when the wireless terminal sends the location measurement message; then, correspondingly, that after receiving the location measurement message, the at least three APs obtain the positioning measurement data and send the positioning measurement data to the location server in the step 602 may specifically be that: after receiving the location measurement message, the at least three APs measure receiving power for receiving the location measurement message, and send the receiving power and the specified transmission power to the location server; correspondingly, that the location server estimates the location information of the wireless terminal according to the positioning measurement data sent by the at least three APs in step 603 may specifically be that: the location server estimates the location information of the wireless terminal according to the receiving power and specified transmission power sent by the at least three APs and location information of each AP.

In Embodiment 5 of the present invention, the wireless terminal does not need to perform a message exchange with each AP one by one to implement location, and is not affected by the number of APs, thereby shortening positioning time. Moreover, in the embodiment of the present invention, because of less message exchanges, the power consumption of the wireless terminal may be greatly saved.

Embodiment 6

Figure 7:
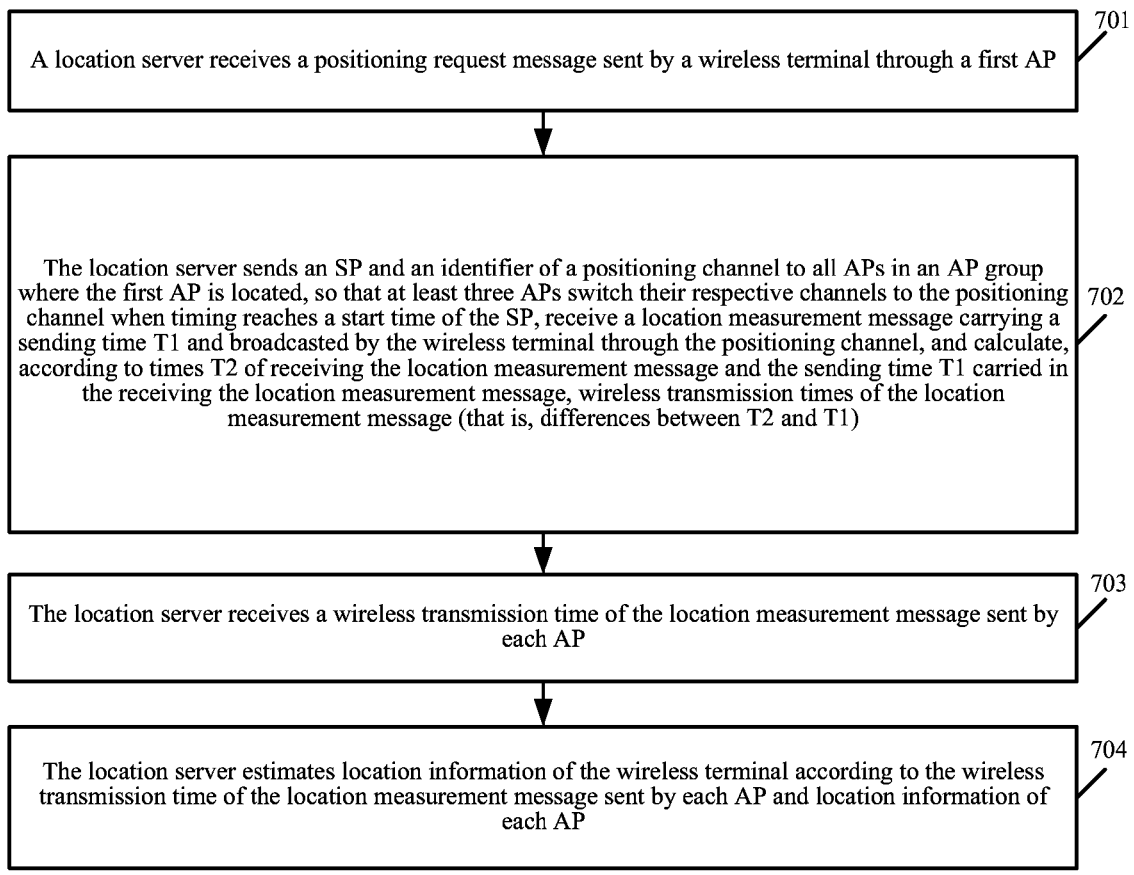

Referring to FIG. 7, FIG. 7 is a flow chart of a method for positioning a wireless terminal according to Embodiment 6 of the present invention. In Embodiment 6 of the present invention, the method for positioning a wireless terminal provided in the embodiment of the present invention is described from the perspective of a location server. As shown in FIG. 7, the method may include the following steps:

701: The location server receives a positioning request message sent by the wireless terminal through a first AP.

702: The location server sends an SP and an identifier of a positioning channel to all APs in an AP group where the first AP is located, so that at least three APs switch their respective channels to the positioning channel when timing reaches a start time of the SP, receive a location measurement message that carries a sending time T1 and is broadcast by the wireless terminal through the positioning channel, and calculate, according to times T2 of receiving the location measurement message and the sending time T1 carried in the location measurement message, wireless transmission times of the location measurement message (that is, differences between T2 and T1).

703: The location server receives a wireless transmission time of the location measurement message sent by each AP.

704: The location server estimates location information of the wireless terminal according to the wireless transmission time of the location measurement message sent by each AP and location information of each AP.

Figure 8:
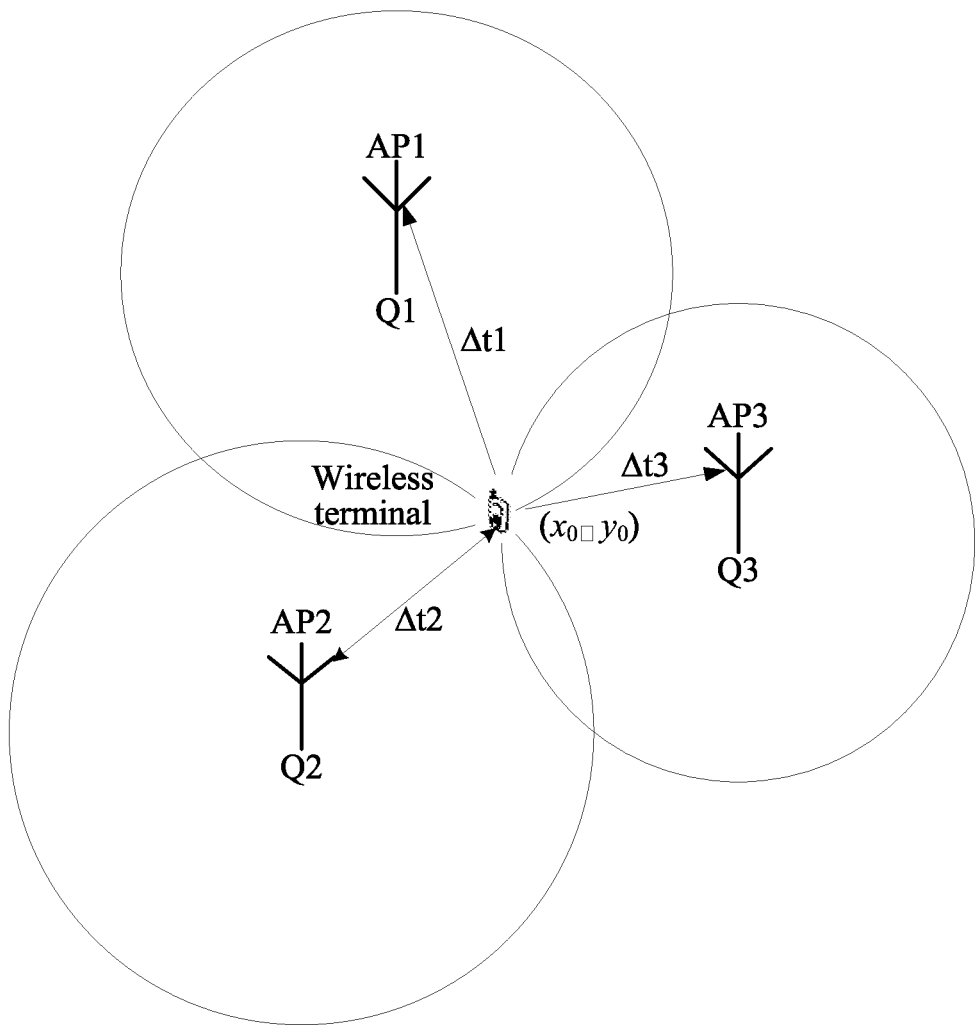

As described in the foregoing embodiment, after receiving the wireless transmission times of the location measurement message (that is, the difference between T2 and T1) sent by the at least three APs, the location server may determine the location information of the wireless terminal through a reference point database. Specifically, the reference point database may be configured to record a wireless transmission time between each sampled wireless terminal location and location information of each AP, so that after receiving the wireless transmission time (that is, the difference between T2 and T1) sent by each AP, the location server may estimate the location information of the wireless terminal from the reference point database. However, this manner requires that the wireless terminal to be synchronized in time with each AP. Referring to FIG. 8 together, FIG. 8 is a schematic diagram of estimating location information of a wireless terminal based on a reference point database according to an embodiment of the present invention. As shown in FIG. 8, it is assumed that at least three APs, namely, AP1, AP2 and AP3 exist, where, a wireless transmission time of the location measurement message sent by AP1 is $\Delta t1$ (that is, wireless transmission time of the location measurement message sent by the wireless terminal between the wireless terminal and AP1 is $\Delta t1$, and $\Delta t1$ is a difference between T2 and T1), so the location server may determine, according to the wireless transmission time $\Delta t1$, all sampled location information of the wireless terminal in a circle Q1 with location information of AP1 as the center of the circle; a wireless transmission time of the location measurement message sent by AP2 is $\Delta t2$ (that is, the wireless transmission time of the location measurement message sent by the wireless terminal between the wireless terminal and AP2 is $\Delta t2$), so the location server may determine, according to the wireless transmission time $\Delta t2$, all sampled location information of the wireless terminal in a circle Q2 with location information of AP2 as the center of the circle; a wireless transmission time of the location measurement message sent by AP3 is $\Delta t3$ (that is, the wireless transmission time of the location measurement message sent by the wireless terminal between the wireless terminal and AP3 is $\Delta t3$), so the location server may determine, according to the wireless transmission time $\Delta t3$, all sampled location information of the wireless terminal in a circle Q3 with location information of AP3 as the center of the circle; on this basis, the location server may select location information of the wireless terminal $(x_0, y_0)$ that is occupied by Q1, Q2, and Q3 together, where, $(x_0, y_0)$ is the location information of the wireless terminal.

Figure 9:
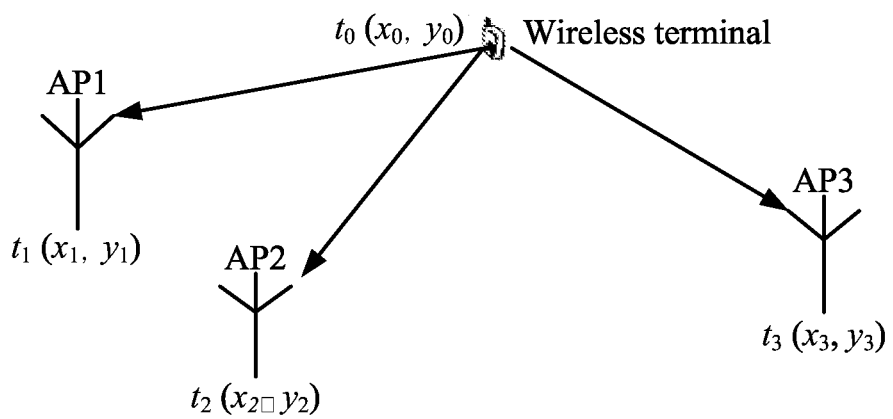
FIG. 9 is a schematic diagram of estimating location information of a wireless terminal based on a reference point database according to an embodiment of the present invention.

As described in the foregoing embodiment, after receiving the wireless transmission time of the location measurement message sent by each AP, the location server may estimate the location information of the wireless terminal through a mathematical formula. Referring to FIG. 9 together, FIG. 9 is a schematic diagram of estimating location information of a wireless terminal based on a mathematical formula according to an embodiment of the present invention. As shown in FIG. 9, it is assumed that at least three APs, namely, AP1, AP2 and AP3 exist, where, $(x_1, y_1)$ represents known location information of AP1, $(x_2, y_2)$ represents known location information of AP2, $(x_3, y_3)$ represents known location information of AP3, so the location server may estimates location information of the wireless terminal $(x_0, y_0)$ according to the following mathematical formula:

$$\begin{cases} \sqrt{(x_1 - x_0)^2 + (y_1 - y_0)^2} = c(t_1 - t_0) \\ \sqrt{(x_2 - x_0)^2 + (y_2 - y_0)^2} = c(t_2 - t_0) \\ \sqrt{(x_3 - x_0)^2 + (y_3 - y_0)^2} = c(t_3 - t_0) \end{cases}$$

where, $t_0$ represents a sending time T1 of the location measurement message, $t_1$ represents a time T2 at which AP1 receives the location measurement message, $t_1 - t_0$ is a wireless transmission time of the location measurement message calculated by AP1; $t_2$ represents a time T2 at which AP2 receives the location measurement message, $t_2 - t_0$ is a wireless transmission time of the location measurement message calculated by AP2; $t_3$ represents a time T3 at which AP3 receives the location measurement message, $t_3 - t_0$ is a wireless transmission time of the location measurement message calculated by AP3; and c represents the speed of light. When the location information of the wireless terminal $(x_0, y_0)$ is estimated through the foregoing mathematical formula, it is required that the APs are synchronized in time.

The foregoing description are made by assuming that all APs are deployed on the same plane and providing wireless terminal positioning on the same plane as an example, and if a wireless terminal positioning service is provided in a three-dimensional space, at least four APs are required, three-dimensional coordinates (x, y, z) of an AP need to be known, and three-dimensional coordinates (x0, y0, z0) of the wireless terminal (STA) need to be calculated, so an equation set at least requires four equations, which should be understood by persons skilled in the art, and is not described in detail again.

Definitely, when calculation is made by actually using the foregoing equations, some similarity processing is required, this is because errors always occur in measurement, and accurate coordinates of the STA cannot always be calculated through the forgoing equation set. In order to obtain a more accurate result, more APs are required, that is, more equations are required to participate in the calculation, and finally a more accurate positioning result is obtained. Persons skilled in the art can understand this calculation process, which is well-known knowledge, and is not further described herein.

Embodiment 6 of the present invention may shorten positioning time of the wireless terminal, and may greatly save the power consumption of the wireless terminal.

Embodiment 7

In Embodiment 7 of the present invention, a method for positioning a wireless terminal provided in the embodiment of the present invention is described from the perspectives of a wireless terminal, an AP group including at least three APs, and a location server. In an embodiment of the present invention, the location server may determine a channel dedicated to perform wireless terminal positioning, which is referred to as a positioning channel, and may also divide a positioning period dedicated to perform the wireless terminal positioning. The wireless terminal, all APs and the location server may be synchronized in time. The location server may allocate, in the positioning period, an SP for each wireless terminal requiring positioning, and the SP allocated to each wireless terminal has a different start time and different end time. In an actual application, to avoid interference, APs work in channels different from each other, and in the 802.11 standard, 13 channels exist, and therefore, in order to perform the wireless terminal positioning service, the location server may select any channel from the 13 channels to serve as the positioning channel. When the wireless terminal performs a positioning request, the location server may allocate the positioning channel, the SP, and the positioning period including at least one SP to the wireless terminal and all the APs. The location server may dynamically adjust the size of the positioning period according to the number of wireless terminals performing a positioning request, that is, the location server may dynamically adjust the number of SPs included in the positioning period according to the number of wireless terminals performing the positioning request.

Figure 10:
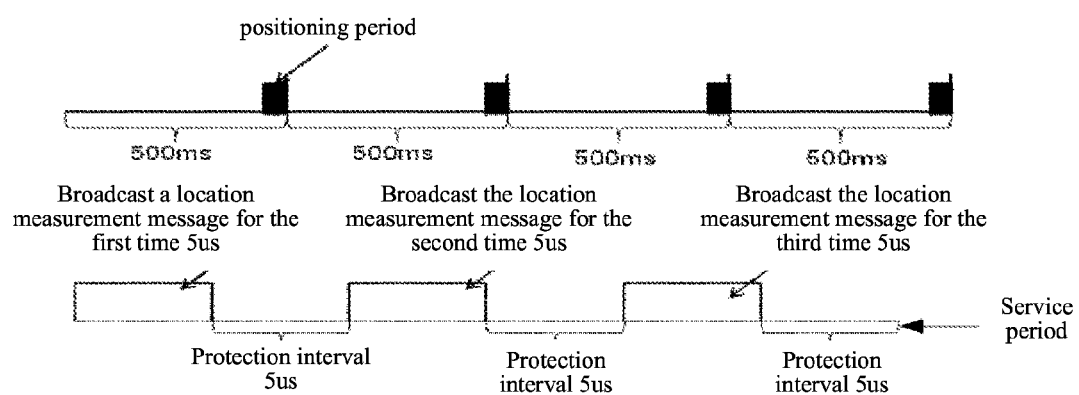
FIG. 10 is a schematic diagram of estimating location information of a wireless terminal based on a mathematical formula according to an embodiment of the present invention.

In an embodiment of the present invention, it is defined that the wireless terminal performs positioning every 2 seconds, the 2 seconds may be divided into 4 segments, and one segment in every 500 ms is obtained through division to serve as a positioning period. It is assumed that one positioning period can support 50 wireless terminals to perform positioning, if each wireless terminal broadcasts the location measurement message successively for 3 times, time for sending the broadcast is 5 μs, and a protection interval of successive broadcast is 5 μs, so time for the wireless terminal to broadcast successively for 3 times is 30 μs, and time required for supporting 50 wireless terminals is 1500 μs, time for channel switch is 1000 μs, and therefore, 2.5 ms in the 500 ms may be allocated to serve as the positioning period, and 30 μs in the 2.5 ms may be considered as the SP allocated by the wireless terminal for each wireless terminal. A schematic diagram of division the positioning period and the SP is shown in FIG. 10.

Figure 11:
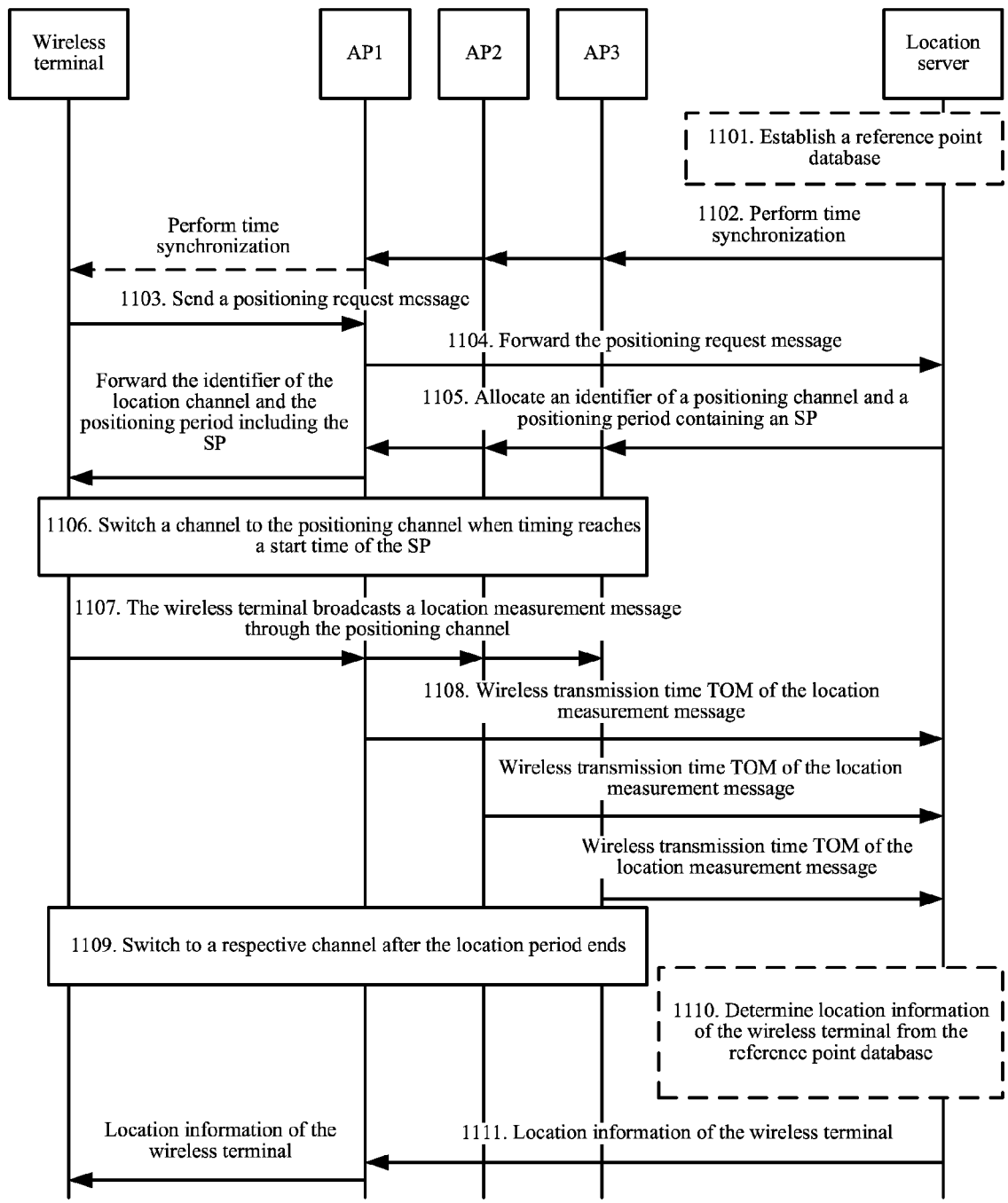
FIG. 11 is a schematic diagram of division of a positioning period and a service period according to an embodiment of the present invention.

Referring to FIG. 11, FIG. 11 is a flow chart of a method for positioning a wireless terminal according to Embodiment 7 of the present invention. Dotted lines represent that a step is optional. As shown in FIG. 11, the method may include the following steps:

1101: The location server establishes a reference point database, where the reference point database may be configured to record a wireless transmission time between each sampled wireless terminal location and location information of each AP (that is, AP1 to AP3). In the embodiment of the present invention, the reference point database may be a time-based reference point database, and may also be a signal intensity-based reference point database.

1102: The location server performs time synchronization with each AP (that is, AP1 to AP3), and AP1 performs time synchronization with the wireless terminal.

AP1 serves as a serving access point of an area where the wireless terminal currently is located.

If the location server determines location information of the wireless terminal through the reference point database, it is required that the wireless terminal, all APs, and the location server are synchronized in time. If the location server estimates the location information of the wireless terminal through a mathematical formula, the wireless terminal does not need to be synchronized in time with all the APs and the location server time, but all the APs need to be synchronized in time with the location server.

1103: The wireless terminal sends a positioning request message (Location_request_trigger) to AP1.

The positioning request message may include information such as a media access control (Media Access Control, MAC) address of the wireless terminal.

1104: After receiving the Location_request_trigger sent by the wireless terminal, AP1 forwards the Location_request_trigger to the location server.

1105: After receiving the Location_request_trigger forwarded by AP1, the location server allocates an identifier of a positioning channel and a positioning period including an SP to each AP (that is, AP1 to AP3), and AP1 forwards the identifier of the positioning channel and positioning period including the SP to the wireless terminal.

1106: When timing reaches a start time of the SP allocated by the location server, each AP (that is, AP1 to AP3) and the wireless terminal switch their respective channels to the positioning channel.

1107: The wireless terminal broadcasts a location measurement message through the positioning channel, and the location measurement message may include a sending time T1, and further, the wireless terminal may broadcast the location measurement message successively for 3 times.

1108: After receiving, through the positioning channel, the location measurement message broadcast by the wireless terminal, each AP (that is, AP1 to AP3) may calculate, according to a time T2 of receiving the location measurement message and the sending time T1 carried in the location measurement message, a wireless transmission time TOM of the location measurement message (that is, a difference between T2 and T1), and send the TOM to the location server.

1109: The wireless terminal and each AP (that is, AP1 to AP3), after the positioning period ends, switch to their respective channels.

1110: After receiving the TOM sent by each AP (that is, AP1 to AP3), the location server determines the location information of the wireless terminal from the reference point database.

After receiving the TOM sent by each AP (that is, AP1 to AP3), the location server may also estimate the location information of the wireless terminal according to a mathematical formula, which is not limited in the present invention.

1111: The location server sends the determined location information of the wireless terminal to AP1, and AP1 forwards the location information to the wireless terminal for display.

In Embodiment 7 of the present invention, the wireless terminal does not need to perform a message exchange with each SP one by one to implement location, and is not affected by the number of SPs, thereby shortening the positioning time. Moreover, in Embodiment 7 of the present invention, because of less message exchanges, the power consumption of the wireless terminal may be greatly saved.

Embodiment 8

Figure 12:
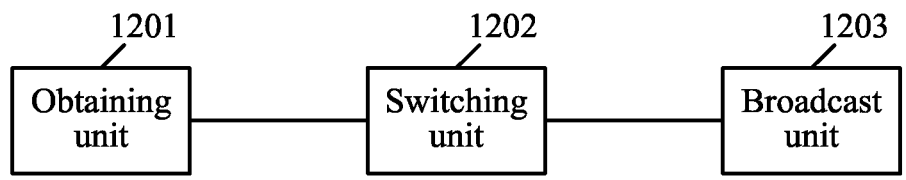
FIG. 12 to FIG. 13 are structural diagrams of two kinds of wireless terminals according to embodiments of the present invention.

Referring to FIG. 12, FIG. 12 is a structural diagram of a wireless terminal according to Embodiment 8 of the present invention. As shown in FIG. 12, the wireless terminal may include:

an obtaining unit 1201, configured to obtain a positioning service period and an identifier of a positioning channel from a first AP;

a switching unit 1202, configured to switch to the positioning channel in the positioning service period; and a broadcast unit 1203, configured to broadcast a location measurement message through the positioning channel, so that after receiving the location measurement message, at least three APs in an AP group where the first AP is located obtain positioning measurement data and send the positioning measurement data to the location server, where the location server estimates location information of the wireless terminal according to positioning measurement data sent by each AP.

In an embodiment, the switching unit 1202 is specifically configured to switch to the positioning channel at a start time of the positioning service period, or switch to the positioning channel at a random time point between a start time and an end time of the positioning service period.

In an embodiment, the obtaining unit 1201 may be specifically configured to monitor a beacon frame of the first AP, and obtain the identifier of the positioning channel, where the identifier is included in the beacon frame; send a positioning request message to the first AP, and receive a positioning response message sent by the first AP, the positioning response message including the positioning service period. Therefore, the obtaining unit 1201 may implement obtaining the positioning service period and the identifier of the positioning channel from the first AP.

In an embodiment, the obtaining unit 1201 may be specifically configured to send a probe request message to the first AP, and receive a probe response message sent by the first AP, where the probe response message includes the positioning service period and the identifier of the positioning channel. Therefore, the obtaining unit 1201 may implement obtaining the positioning service period and the identifier of the positioning channel from the first AP.

In an embodiment, the obtaining unit 1201 may be specifically configured to send a positioning request message to the first AP, and receive a positioning response message sent by the first AP, where the positioning response message includes the positioning service period and the identifier of the positioning channel.

In an embodiment, a specific manner in which after receiving the location measurement message, the at least three APs obtain the positioning measurement data and send the positioning measurement data to the location server, where the location server estimates the location information of the wireless terminal according to the positioning measurement data sent by each AP is that: the at least three APs each record a time T2 of receiving the location measurement message, and send the time T2 to the location server, where the location server estimates the location information of the wireless terminal according to T2 sent by each AP and location information of each AP; where, all the APs in the AP group are synchronized in time.

In an embodiment, the wireless terminal is synchronized in time with all the APs in the AP group, and the location measurement message includes a time T1 at which the wireless terminal sends the location measurement message; then correspondingly, a specific manner in which after receiving the location measurement message, the at least three APs obtain the positioning measurement data and send the positioning measurement data to the location server, where the location server estimates the location information of the wireless terminal according to the positioning measurement data sent by each AP is specifically that: the at least three APs each record a time T2 of receiving the location measurement message, and send T2 and the time T1 to the location server, where the location server estimates the location information of the wireless terminal according to T2 and T1 sent by each AP and location information of each AP; or, the at least three APs each record a time T2 of receiving the location measurement message, and send a difference between T2 and the time T1 (that is, a wireless transmission time of the location measurement message) to the location server, where the location server estimates the location information of the wireless terminal according to a difference between T2 and the time T1 sent by each AP and location information of each AP.

In an embodiment, a specific manner in which the wireless terminal broadcasts the location measurement message through the positioning channel is that: the wireless terminal broadcasts the location measurement message through the positioning channel by using specified transmission power; then, correspondingly, a specific manner in which after receiving the location measurement message, the at least three APs obtain the positioning measurement data and send the positioning measurement data to the location server, where the location server estimates the location information of the wireless terminal according to the positioning measurement data sent by each AP is that: the at least three APs each measure receiving power for receiving the location measurement message, and send the receiving power to the location server, where the location server estimates the location information of the wireless terminal according to receiving power sent by each AP, the specified transmission power stored in the location server, and location information of each AP.

In an embodiment, the location measurement message includes specified transmission power that is used when the wireless terminal sends the location measurement message; then, correspondingly, a specific manner in which after receiving the location measurement message, the at least three APs obtain the positioning measurement data and send the positioning measurement data to the location server, where the location server estimates the location information of the wireless terminal according to the positioning measurement data sent by each AP is that: the at least three APs each measure receiving power for receiving the location measurement message, and send the receiving power and the specified transmission power to the location server, where the location server estimates the location information of the wireless terminal according to the specified transmission power and receiving power sent by each AP and location information of each AP.

In Embodiment 8 of the present invention, the wireless terminal does not need to perform a message exchange with each SP one by one to implement location, and is not affected by the number of SPs, thereby shortening the positioning time. Moreover, in Embodiment 8 of the present invention, because of less message exchanges, the power consumption of the wireless terminal may be greatly saved.

Embodiment 9

Figure 13:
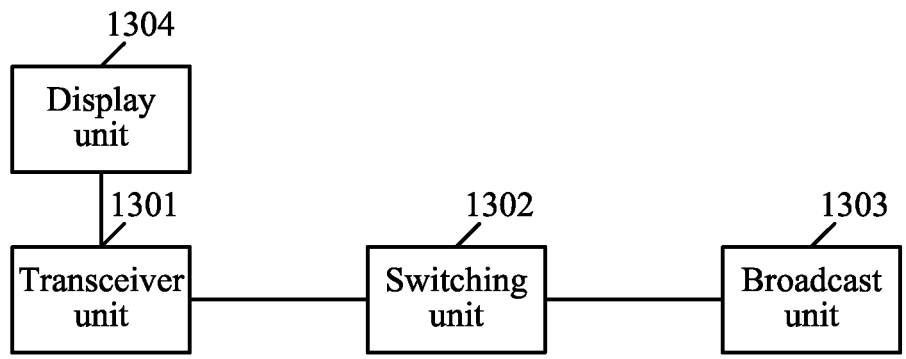

Referring to FIG. 13, FIG. 13 is a structural diagram of another wireless terminal according to Embodiment 9 of the present invention. As shown in FIG. 13, the wireless terminal may include:

a transceiver unit 1301, configured to send a positioning request message to a location server through a first AP, and receive an SP and an identifier of a positioning channel that are allocated by the location server and sent by the first AP;

a switching unit 1302, configured to switch a channel of the wireless terminal to the positioning channel when timing reaches a start time of the SP allocated by the location server; and a broadcast unit 1303, configured to broadcast, through a positioning channel allocated by the location server, a location measurement message carrying a sending time T1, so that at least three APs including the first AP each calculate, according to a time T2 of receiving the location measurement message and the sending time T1 carried in the location measurement message, a wireless transmission time of the location measurement message (that is, a difference between T2 and T1), and send the wireless transmission time of the location measurement message to the location server, where the location server estimates location information of the wireless terminal according to wireless transmission times of the location measurement message sent by the at least three APs including the first AP, and location information of each AP.

In the embodiment of the present invention, the wireless transmission times of the location measurement message sent by the at least three APs including the first AP is a transmission time of the location measurement message between the wireless terminal and each AP, where the location measurement message is broadcast by the wireless terminal.

As an optional implementation, the transceiver unit 1301 is further configured to receive a positioning period that is allocated by the location server and sent by the first AP; the positioning period includes at least one SP; correspondingly, the switching unit 1302 is further configured to, after the broadcast unit 1303 broadcasts, through the positioning channel, the location measurement message carrying the sending time T1, if the positioning period ends, switch the positioning channel to a channel of the wireless terminal, thereby restoring a service operation of the wireless terminal.

As an optional implementation, in the embodiment of the present invention, the transceiver unit 1301 is further configured to receive the location information of the wireless terminal that is estimated by the location server and sent by the first AP; correspondingly, the wireless terminal may further include a display unit 1304, configured to display the location information of the wireless terminal received by the transceiver unit 1301, so that a subscriber may know a location of the subscriber in real time.

In Embodiment 9 of the present invention, the wireless terminal does not need to perform a message exchange with each AP one by one to implement location, and is not affected by the number of APs, thereby shortening positioning time. Moreover, in Embodiment 9 of the present invention, because of less message exchanges, the power consumption of the wireless terminal may be greatly saved.

Embodiment 10

Figure 14:
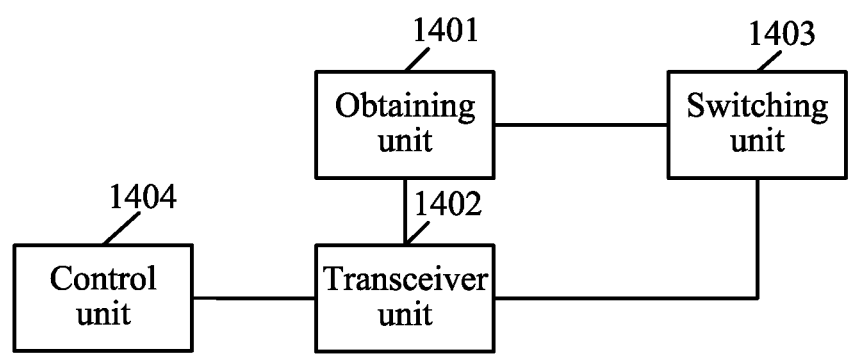
FIG. 14 to FIG. 15 are structural diagrams of two kinds of access points according to embodiments of the present invention.

Referring to FIG. 14, FIG. 14 is a structural diagram of an access point according to Embodiment 10 of the present invention. As shown in FIG. 14, the access point may include:

an obtaining unit 1401, configured to obtain a positioning service period from a location server;

a transceiver unit 1402, configured to send the positioning service period and an identifier of a positioning channel to the wireless terminal, so that the wireless terminal switches to the positioning channel in the positioning service period, and broadcasts a location measurement message through the positioning channel;

where, the identifier of the positioning channel may be pre-configured on this AP, and may also be allocated by the location server to this AP;

a switching unit 1403, configured to switch to the positioning channel in the positioning service period;

where the transceiver unit 1402 is further configured to receive, through the positioning channel, the location measurement message broadcast by the wireless terminal; and a control unit 1404, configured to, after the transceiver unit 1402 receives the location measurement message, obtain positioning measurement data and send the positioning measurement data to the location server, where the location server estimates the location information of the wireless terminal according to positioning measurement data sent by at least three APs in an AP group where this AP is located.

As an optional implementation, the obtaining unit 1401 is specifically configured to receive a probe request message sent by the wireless terminal, where the probe request message includes positioning request information; and send the positioning request message to the location server, and receive the positioning service period allocated by the location server.

As another optional implementation, the obtaining unit 1401 is specifically configured to receive a positioning request message sent by the wireless terminal, send the positioning request message to the location server, and receive the positioning service period allocated by the location server.

In an embodiment, the control unit 1404 is specifically configured to, after the transceiver unit 1402 receives the location measurement message, record a time T2 at which the transceiver unit 1402 receives the location measurement message, and send the time T2 to the location server, where the location server estimates the location information of the wireless terminal according to times T2 sent by the at least three APs and location information of each AP; where, all APs in the AP group are synchronized in time.

In an embodiment, the wireless terminal is synchronized in time with all APs in the AP group, and the location measurement message includes a time T1 at which the wireless terminal sends the location measurement message; then correspondingly, the control unit 1404 is specifically configured to, after the transceiver unit 1402 receives the location measurement message, record a time T2 at which the transceiver unit 1402 receives the location measurement message, and send T2 and the time T1 to the location server, where the location server estimates the location information of the wireless terminal according to T2 and T1 sent by the at least three APs and location information of each AP; or, the control unit 1404 is specifically configured to, after the transceiver unit 1402 receives the location measurement message, record a time T2 at which the transceiver unit 1402 receives the location measurement message, and send a difference between T2 and the time T1 to the location server, where the location server estimates the location information of the wireless terminal according to differences that are between T2 and the time T1 and sent by the at least three APs and location information of each AP. In this embodiment, a working load brought by the location server calculating the difference between T2 and the time T1 may be reduced.

In an embodiment, a specific manner in which the wireless terminal broadcasts the location measurement message through the positioning channel is that: the wireless terminal broadcasts the location measurement message through the positioning channel by using specified transmission power; then correspondingly, the control unit 1404 is specifically configured to, after the transceiver unit 1402 receives the location measurement message, measure receiving power of the transceiver unit 1402 receiving the location measurement message, and send the receiving power to the location server, where the location server estimates the location information of the wireless terminal according to receiving power sent by the at least three APs, the specified transmission power stored in the location server, and location information of each AP.

In an embodiment, the location measurement message includes specified transmission power that is used when the wireless terminal sends the location measurement message; then correspondingly, the control unit 1404 is specifically configured to, after the transceiver unit 1402 receives the location measurement message, measure receiving power of the transceiver unit 1402 receiving the location measurement message, and send the receiving power and the specified transmission power to the location server, where the location server estimates the location information of the wireless terminal according to the specified transmission power and receiving power sent by the at least three APs and location information of each AP.

In Embodiment 10 of the present invention, the wireless terminal also does not need to perform a message exchange with each AP one by one to implement location, and is not affected by the number of APs, thereby shortening positioning time. Moreover, in Embodiment 9 of the present invention, because of less message exchanges, the power consumption of the wireless terminal may be greatly saved.

Embodiment 11

Figure 15:
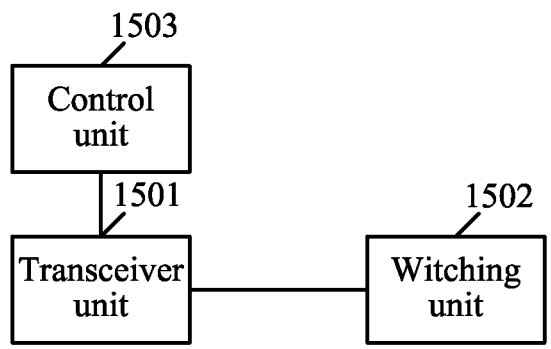

Referring to FIG. 15, FIG. 15 is a structural diagram of another access point according to Embodiment 11 of the present invention. As shown in FIG. 15, the access point may include:

a transceiver unit 1501, configured to receive a positioning request message sent by a wireless terminal, and send the positioning request message to a location server; receive an SP and an identifier of a positioning channel that are allocated by the location server, and send the SP and the identifier of the positioning channel to the wireless terminal, so that the wireless terminal switches its channel to the positioning channel when timing reaches a start time of the SP, and broadcasts, through the positioning channel, a location measurement message carrying a sending time T1;

a switching unit 1502, configured to switch a channel of this access point to the positioning channel when the timing reaches the start time of the SP allocated by the location server;

where, the transceiver unit 1501 is further configured to receive, through the positioning channel, the location measurement message that carries the sending time T1 and is broadcast by the wireless terminal; and a control unit 1503, configured to calculate, according to a time T2 at which the transceiver unit 1501 receives the location measurement message and the sending time T1 carried in the location measurement message, a wireless transmission time of the location measurement message (that is, a difference between T2 and T1) and send the wireless transmission time of the location measurement message to the location server, so that the location server estimates the location information of the wireless terminal according to wireless transmission times of the location measurement message sent by at least three APs including this access point.

As an optional implementation, the transceiver unit 1501 is configured to receive the positioning period allocated by the location server, and send the positioning period to the wireless terminal; the positioning period includes at least one SP; correspondingly, the switching unit 1502 is further configured to, after the control unit 1503 sends the calculated wireless transmission time of the location measurement message to the location server, if the positioning period ends, switch the positioning channel to the channel of the access point, thereby restoring a service operation of the wireless terminal.

As an optional implementation, in the embodiment of the present invention, the transceiver unit 1501 is further configured to receive the location information of the wireless terminal estimated by the location server, and send the location information of the wireless terminal to the wireless terminal for display, so that a subscriber may know a location of the subscriber in real time.

The access point provided in Embodiment 11 of the present invention may shorten the positioning time of the wireless terminal; and because of less message exchanges, the power consumption of the wireless terminal may be greatly saved.

Embodiment 12

Figure 16:
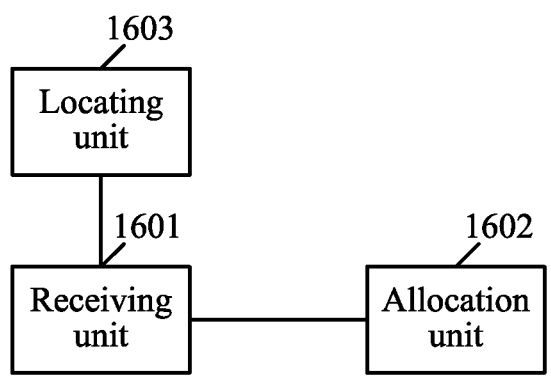
FIG. 16 to FIG. 17 are structural diagrams of two kinds of location servers according to embodiments of the present invention.

Referring to FIG. 16, FIG. 16 is a structural diagram of a location server according to Embodiment 12 of the present invention. As shown in FIG. 16, the location server may include:

a receiving unit 1601, configured to receive a positioning request message sent by a first AP;

an allocation unit 1602, configured to allocate a positioning service period to all APs in an AP group where the first AP is located, so that the at least three APs each switch to a positioning channel in the positioning service period, receive a location measurement message broadcast by the wireless terminal through the positioning channel, and after receiving the location measurement message, obtain positioning measurement data and send the positioning measurement data to the location server; and a positioning unit 1603, configured to estimate location information of the wireless terminal according to the positioning measurement data sent by the at least three APs.

The location server provided in the embodiment of the present invention may be pre-configured on any AP in the AP group.

In an embodiment, a specific manner in which after receiving the location measurement message, the at least three APs obtain the positioning measurement data and send the positioning measurement data to the location server is that: after receiving the location measurement message, the at least three APs each record a time T2 of receiving the location measurement message, and send the time T2 to the location server; then correspondingly, the positioning unit 1603 may be specifically configured to estimate the location information of the wireless terminal according to times T2 sent by the at least three APs and location information of each AP; where, all APs in the AP group are synchronized in time.

In an embodiment, the wireless terminal is synchronized in time with all the APs in the AP group, and the location measurement message includes a time T1 at which the wireless terminal sends the location measurement message; correspondingly, a specific manner in which after receiving the location measurement message, the at least three APs obtain the positioning measurement data and send the positioning measurement data to the location server is that: after receiving the location measurement message, each AP records a time T2 of receiving the location measurement message, and sends T2 and the time T1 to the location server; or, after receiving the location measurement message, the at least three APs each record a time T2 of receiving the location measurement message, and send a difference between T2 and the time T1 to the location server; then correspondingly, the positioning unit 1603 may be specifically configured to estimate the location information of the wireless terminal according to T2 and T1 sent by the at least three APs and location information of each AP; or, configured to estimate the location information of the wireless terminal according to differences that are between T2 and the time T1 and sent by the at least three APs and location information of each AP.

In an embodiment, a specific manner in which the wireless terminal broadcasts the location measurement message through the positioning channel is that: the wireless terminal broadcasts the location measurement message through the positioning channel by using specified transmission power; correspondingly, a specific manner in which after receiving the location measurement message, the at least three APs obtain the positioning measurement data and send the positioning measurement data to the location server is that: after receiving the location measurement message, the at least three APs measure receiving power for receiving the location measurement message, and send the receiving power to the location server; then correspondingly, the positioning unit 1603 may be specifically configured to estimate the location information of the wireless terminal according to the receiving power sent by the at least three APs, the specified transmission power stored in the location server, and location information of each AP.

In an embodiment, the location measurement message includes specified transmission power that is used when the wireless terminal sends the location measurement message; correspondingly, a specific manner in which after receiving the location measurement message, the at least three APs obtain the positioning measurement data and send the positioning measurement data to the location server is that: after receiving the location measurement message, the at least three APs measure receiving power for receiving the location measurement message, and send the receiving power and the specified transmission power to the location server; then correspondingly, the positioning unit 1603 may be specifically configured to estimate the location information of the wireless terminal according to the receiving power and specified transmission power sent by the at least three APs and location information of each AP.

The location server provided in Embodiment 12 of the present invention may shorten positioning time of the wireless terminal; and because of less message exchanges, the power consumption of the wireless terminal may be greatly saved.

Embodiment 13

Figure 17:
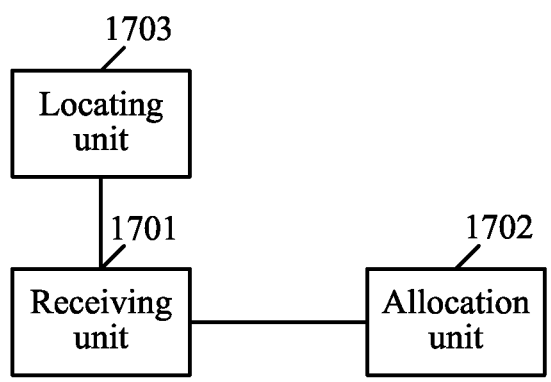

Referring to FIG. 17, FIG. 17 is a structural diagram of another location server according to Embodiment 13 of the present invention. As shown in FIG. 17, the location server may include:

a receiving unit 1701, configured to receive a positioning request message sent by a wireless terminal through a first AP;

an allocation unit 1702, configured to allocate an SP and an identifier of a positioning channel to all APs in an AP group where the first AP is located, so that the at least three APs switch their respective channels to the positioning channel when timing reaches a start time of the SP, receive a location measurement message that carries a sending time T1 and is broadcast by the wireless terminal through the positioning channel, and calculate, according to times T2 of receiving the location measurement message and the sending time T1 carried in the location measurement message, wireless transmission times of the location measurement message (that is, differences between T2 and T1);

where the receiving unit 1701 is further configured to receive the wireless transmission times of the location measurement message sent by the at least three APs; and a positioning unit 1703, configured to estimate location information of the wireless terminal according to the wireless transmission times of the location measurement message sent by the at least three APs and location information of each AP.

As an optional implementation, the allocation unit 1702 is further configured to allocate a positioning period including at least one SP to each AP in the AP group, so that each AP switches the positioning channel to a respective channel when the positioning period ends, thereby restoring a service operation of each AP.

As an optional implementation, the positioning unit 1703 may estimate, according to a wireless transmission time of the location measurement message sent by each AP, the location information of the wireless terminal from a pre-configured reference point database; where, the reference point database is configured to record a wireless transmission time between each sampled wireless terminal location and location information of each AP; where, the wireless terminal is synchronized in time with each access point.

As another optional implementation, the positioning unit 1703 may estimate, according to the wireless transmission times of the location measurement message sent by at least the first AP, a second AP and a third AP, the location information of the wireless terminal according to the following formula:

$$\begin{cases} \sqrt{(x_1-x_0)^2+(y_1-y_0)^2} = c(t_1-t_0) \\ \sqrt{(x_2-x_0)^2+(y_2-y_0)^2} = c(t_2-t_0) \\ \sqrt{(x_3-x_0)^2+(y_3-y_0)^2} = c(t_3-t_0) \end{cases}$$

where, c represents the speed of light, $(x_0, y_0)$ represents to-be-estimated location information of the wireless terminal, $(x_1, y_1)$ represents known location information of the first AP, $(x_2, y_2)$ represents known location information of the second AP, $(x_3, y_3)$ represents known location information of the third AP, $t_0$ represents the sending time T1 of the location measurement message, $t_1$ represents a time T2 at which the first AP receives the location measurement message, $t_1-t_0$ represents a wireless transmission time of the location measurement message calculated by the first AP; $t_2$ represents a time T2 at which the second AP receives the location measurement message, $t_2-t_0$ represents a wireless transmission time of the location measurement message calculated by the second AP; $t_3$ represents a time T2 at which the third AP receives the location measurement message, $t_3-t_0$ represents a wireless transmission time of the location measurement message calculated by the third AP; c represents the speed of light; and the access points are synchronized in time with each other.

The location server provided in Embodiment 13 of the present invention may shorten positioning time of the wireless terminal; and may greatly save the power consumption of the wireless terminal.

Embodiment 14

Figure 18:
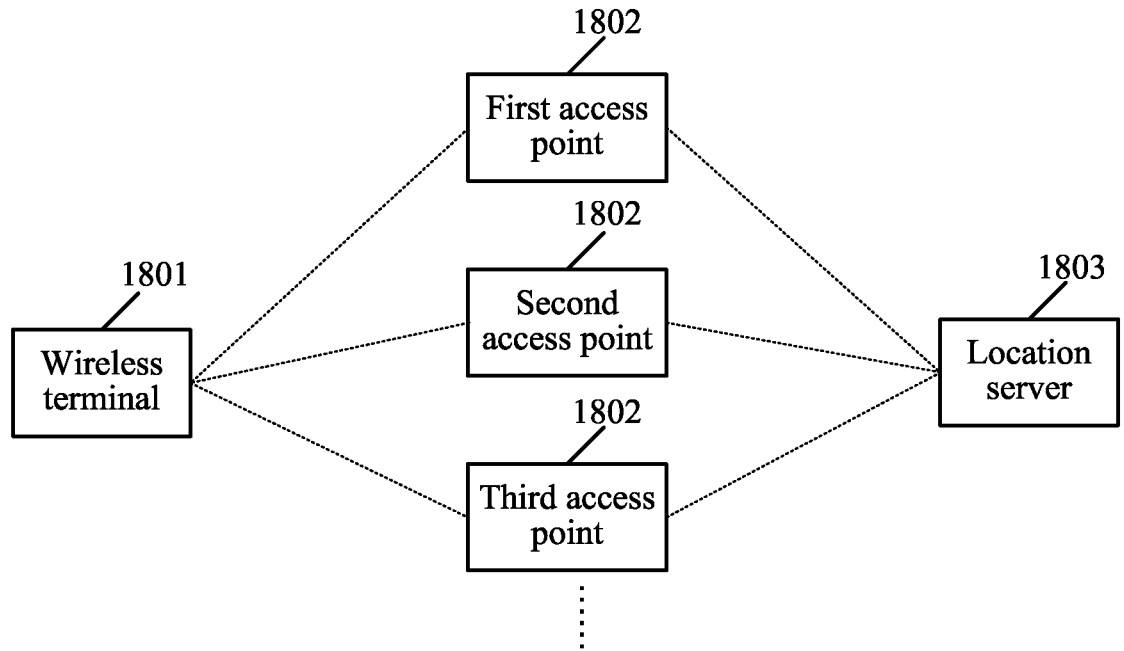
FIG. 18 to FIG. 19 are structural diagrams of two kinds of systems for positioning a wireless terminal according to embodiments of the present invention.

Referring to FIG. 18, FIG. 18 is a structural diagram of a system for positioning a wireless terminal according to Embodiment 14 of the present invention. As shown in FIG. 18, the system for positioning a wireless terminal may include a wireless terminal 1801, an access point group including at least three access points 1802, and a location server 1803.

The wireless terminal 1801 is configured to obtain a positioning service period and an identifier of a positioning channel from a first access point 1802 in the access point group, switch to the positioning channel in the positioning service period, and broadcast a location measurement message through the positioning channel.

In an embodiment, the wireless terminal 1801 may send a positioning request message to the first access point 1802 in the access point group, and receive the positioning service period and the identifier of the positioning channel that are sent by the first access point 1802; switch to the positioning channel when timing reaches a start time of the positioning service period, and broadcast the location measurement message through the positioning channel.

The first access point 1802 is configured to obtain the positioning service period from the location server 1803, send the positioning service period and the identifier of the positioning channel to the wireless terminal 1801, switch to the positioning channel in the positioning service period, and receive, through the positioning channel, the location measurement message broadcast by the wireless terminal 1801 through the positioning channel, and after receiving the location measurement message, obtain positioning measurement data and send the positioning measurement data to the location server 1803.

In an embodiment, the first access point 1802 may receive a positioning request message sent by the wireless terminal 1801, and send the positioning request message to the location server 1803; receive the positioning service period allocated by the location server 1803, and send the positioning service period and the identifier of the positioning channel to the wireless terminal 1801; switch to the positioning channel when the timing reaches a start time of the positioning service period, and receive, through the positioning channel, the location measurement message broadcast by the wireless terminal 1801; and after receiving the location measurement message, obtain the positioning measurement data and send the positioning measurement data to the location server 1803.

Other access points 1802 in the access point group except the first access point are configured to obtain the positioning service period from the location server 1803, switch to the positioning channel in the positioning service period, receive, through the positioning channel, the location measurement message broadcast by the wireless terminal 1801 through the positioning channel, and after receiving the location measurement message, obtain positioning measurement data and send the positioning measurement data to the location server 1803.

In an embodiment, other access points 1802 in the access point group except the first access point may receive the positioning service period allocated by the location server 1803, switch to the positioning channel when the timing reaches the start time of the positioning service period, receive, through the positioning channel, the location measurement message broadcast by the wireless terminal 1801, and after receiving the location measurement message, obtain positioning measurement data and send the positioning measurement data to the location server 1803.

The location server 1803 is configured to send the positioning service period to all the access points 1802 in the access point group, and receive positioning measurement data sent by the at least three access points 1802 in the access point group, so as to estimate the location information of the wireless terminal 1801.

In an embodiment, the location server 1803 may receive a positioning request message sent by the first access point 1802, allocate the service period to all access points 1802 in the access point group, and receive the positioning measurement data sent by the at least three access points 1802, so as to estimate the location information of the wireless terminal 1801.

In an embodiment, the location server 1803 may be preconfigured on any access point in the access point group.

A dotted line indicates a wireless link.

The system for positioning a wireless terminal provided in Embodiment 14 of the present invention may shorten positioning time of the wireless terminal; and may greatly save the power consumption of the wireless terminal.

Embodiment 15

Figure 19:
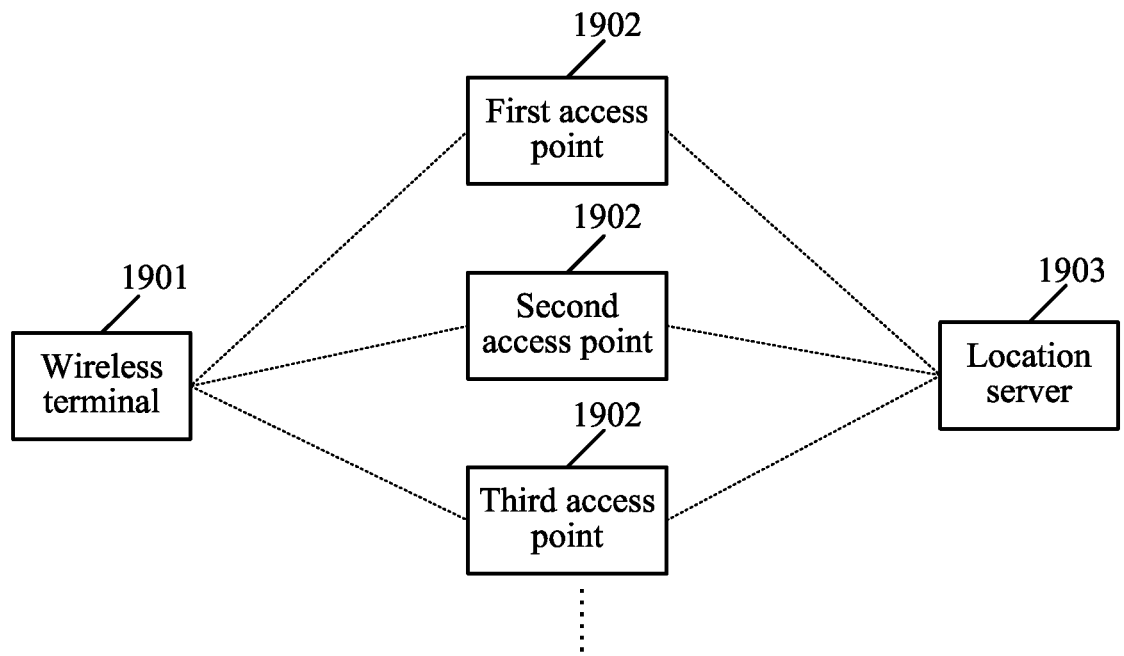

Referring to FIG. 19, FIG. 19 is a structural diagram of another system for positioning a wireless terminal according to Embodiment 15 of the present invention. As shown in FIG. 19, the system for positioning a wireless terminal may include at least three access points 1902 and a location server 1903, and may further include a wireless terminal 1901.

The wireless terminal 1901 is configured to send a positioning request message to a first access point 1902 in the at least three access points, and receive an SP and an identifier of a positioning channel that are sent by the first access point 1902; and switch to a channel of the wireless terminal 1901 to the positioning channel when timing reaches a start time of the SP allocated by the location server 1903, and broadcast, through the positioning channel, a location measurement message carrying a sending time T1.

The structure of the wireless terminal 1901 has been introduced in the foregoing embodiment, which is not repeated in the embodiment of the present invention.

The first access point 1902 is configured to receive the positioning request message sent by the wireless terminal 1901, and send the positioning request message to the location server 1903; receive the SP and the identifier of the positioning channel that are allocated by the location server 1903, and send the SP and the identifier of the positioning channel to the wireless terminal 1901; switch a channel of the first access point 1902 to the positioning channel when the timing reaches the start time of the SP, and receive, through the positioning channel, the location measurement message that carries the sending time T1 and is broadcast by the wireless terminal 1901; and calculate, according to a time T2 of receiving the location measurement message and the sending time T1 carried in the location measurement message, a wireless transmission time of the location measurement message and send the wireless transmission time of the location measurement message to the location server 1903.

Other access points 1902 except the first access point are configured to obtain the SP and the identifier of the positioning channel that are allocated by the location server 1903, switch their respective channels to the positioning channel when the timing reaches the start time of the SP, receive, through the positioning channel, the location measurement message that carries the sending time T1 and is broadcast by the wireless terminal 1901, calculate, according to times T2 of receiving the location measurement message and the sending time T1 carried in the location measurement message, wireless transmission times of the location measurement message and send the wireless transmission times of the location measurement message to the location server 1903.

The location server 1903 is configured to receive the positioning request message sent by the first access point 1902, and allocate the SP and identifier of the positioning channel to each access point 1902; receive a wireless transmission time of the location measurement message sent by each access point 1902, and estimate location information of the wireless terminal according to the wireless transmission time of the location measurement message sent by each access point 1902.

The structure of the location server 1903 has been introduced in the foregoing embodiment, and is not repeated in the embodiment of the present invention.

As an optional implementation, the location server 1903 is further configured to send the positioning period to each access point 1902, the positioning period including at least one SP; correspondingly, the first access point 1902 is further configured to send, to the wireless terminal 1901, the positioning period allocated by the location server 1903; and each of the access points 1902 including the first access point 1902 is further configured to, after sending the calculated wireless transmission time of the location measurement message to the location server 1903, if the positioning period ends, switch the positioning channel to its respective channel. Correspondingly, the wireless terminal 1901 is further configured to receive the positioning period sent by the first access point 1902, and after broadcasting, through the positioning channel, the location measurement message carrying the sending time, if the positioning period ends, switch the positioning channel to the channel of the wireless terminal 1901.

A dotted line indicates a wireless link.

In Embodiment 15 of the present invention, the wireless terminal does not need to perform a message exchange with every access point one by one to implement the positioning, and is not affected by the number of access points, thereby shortening positioning time. Moreover, in the embodiment of the present invention, because of less message exchange, the power consumption of the wireless terminal may be greatly saved.

In the embodiment of the present invention, a positioning process is described with a case that the location server performs location estimation, and actually, the location server may be located in any AP, so a function of the location server may also be a function of the AP, a certain AP may be designated to implement the function of the location server, and all APs in an AP set may also implement the function of the location server in a distributed solution. For example, the positioning period may be designated by any AP, and then other APs accept this designation and may modify the length of the positioning period when the number of terminals requesting positioning increases, and all the APs also accept a positioning service period arranged by any AP for any terminal. Finally, location estimation may also be performed by the terminal itself, if a manner of querying a database is adopted, the terminal needs to load a location database in advance, and receive, server from a connected AP and after each measurement, all measurement results of this measurement collected by the location server, and the terminal obtains a positioning result through table lookup. If a calculation manner is adopted, the terminal also obtains, from the connected AP and after each measurement, the measurement results collected by the location server, and performs calculation.

The calculation described in the foregoing actually cannot obtain an actual accurate location of an STA, and can only reduce an error as much as possible, so that the result is closer to the actual location of the STA, and therefore, all a calculation process may be understood as estimation. However, the present invention does not emphasize how to calculate the location of the STA, but provide a new communication mechanism to implement a positioning function, which, compared with an existing positioning technology, makes the STA more power-saving, more AP channel resources being saved, and more accurate estimation result being obtained more easily.

Persons skilled in the art may understand that all or part of the steps of the methods in the embodiments may be implemented by a program instructing relevant hardware. The program may be stored in a computer readable storage medium, and the storage medium may include: a flash drive, a read-only memory (Read-Only Memory, ROM), a random access memory (Random Access Memory, RAM), a magnetic disk, an optical disk or the like.

The method for positioning a wireless terminal, and the related device and system provided in the embodiments of the present invention are described in detail above. The principle and implementation of the present invention are described herein through specific examples. The description about the foregoing embodiments is merely used for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for positioning a wireless terminal, the method comprising:
sending, by the wireless terminal, a positioning request message to a first access point;
obtaining, by the wireless terminal, a positioning service period and an identifier of a positioning channel from the first access point;
switching, by the wireless terminal, to the positioning channel in the positioning service period; and
broadcasting, by the wireless terminal, a location measurement message comprising a broadcast sending time through the positioning channel, so that at least three access points in an access point group where the first access point is located obtain positioning measurement data after receiving the location measurement message, so as to estimate a location of the wireless terminal.

2. The method according to claim 1, wherein obtaining the positioning service period and the identifier of the positioning channel from the first access point comprises:
monitoring, by the wireless terminal, a beacon frame of the first access point; and
obtaining the identifier of the positioning channel, wherein the identifier is comprised in the beacon frame; and
receiving a positioning response message sent by the first access point, wherein the positioning response message comprises the positioning service period.

3. The method according to claim 1, wherein obtaining the positioning service period and the identifier of the positioning channel from the first access point comprises:
sending, by the wireless terminal, a probe request message to the first access point;
receiving, by the wireless terminal, a probe response message sent by the first access point; and
obtaining the positioning service period and the identifier of the positioning channel that are comprised in the probe response message.

4. The method according to claim 1, wherein obtaining the positioning service period and the identifier of the positioning channel from the first access point specifically comprises:
receiving, by the wireless terminal, a positioning response message sent by the first access point, wherein the positioning response message comprises the positioning service period and the identifier of the positioning channel.

5. The method according to claim 1, wherein switching to the positioning channel in the positioning service period comprises:
   switching, by the wireless terminal, to the positioning channel at a start time of the positioning service period.

6. The method according to claim 1, wherein switching to the positioning channel in the positioning service period comprises:
   switching, by the wireless terminal, to the positioning channel at a random time point between a start time and an end time of the positioning service period.

7. A method for positioning a wireless terminal, the method comprising:
   receiving, by a first access point, a positioning request message sent by the wireless terminal;
   obtaining, by the first access point, a positioning service period from a location server;
   sending, by the first access point, the positioning service period and an identifier of a positioning channel to the wireless terminal, so that the wireless terminal switches to the positioning channel in the positioning service period and broadcasts a location measurement message comprising a broadcast sending time through the positioning channel;
   switching, by at least three access points in an access point group where the first access point is located, to the positioning channel in the positioning service period; and
   receiving, through the positioning channel, the location measurement message broadcast by the wireless terminal; and
   obtaining, by the at least three access points, positioning measurement data after receiving the location measurement message, so as to estimate a location of the wireless terminal.

8. The method according to claim 7, wherein obtaining the positioning service period from the location server comprises:
   receiving, by the first access point, a probe request message sent by the wireless terminal, wherein the probe request message comprises positioning request information;
   sending, by the first access point, a positioning request message to the location server; and
   receiving the positioning service period allocated by the location server.

9. The method according to claim 7, wherein obtaining the positioning service period from the location server comprises:
   sending, by the first access point, the positioning request message to the location server; and
   receiving the positioning service period allocated by the location server.

10. The method according to claim 7, wherein the location server is pre-configured on any access point in the access point group where the first access point is located.

11. The method according to claim 7, wherein the identifier of the positioning channel is pre-configured on the first access point or is sent to the first access point by the location server.

12. A wireless terminal, comprising:
   an obtaining unit, configured to send a positioning request message to a first access point and obtain a positioning service period and an identifier of a positioning channel;
   a switching unit, configured to switch to the positioning channel in the positioning service period; and
   a broadcast unit, configured to broadcast a location measurement message comprising a broadcast sending time through the positioning channel, so that at least three access points in an access point group where the first access point is located can obtain positioning measurement data after receiving the location measurement message, so as to estimate a location of the wireless terminal.

13. The wireless terminal according to claim 12, wherein the obtaining unit is specifically configured to monitor a beacon frame of the first access point and to obtain the identifier of the positioning channel, wherein the identifier is comprised in the beacon frame, the obtaining unit also being configured to receive a positioning response message sent by the first access point, wherein the positioning response message comprises the positioning service period.

14. The wireless terminal according to claim 12, wherein the obtaining unit is specifically configured to send a probe request message to the first access point, to receive a probe response message sent by the first access point, and to obtain the positioning service period and the identifier of the positioning channel that are comprised in the probe response message.

15. The wireless terminal according to claim 12, wherein the obtaining unit is specifically configured to receive a positioning response message sent by the first access point, wherein the positioning response message comprises the positioning service period and the identifier of the positioning channel.

16. The wireless terminal according to claim 12, wherein the switching unit is specifically configured to switch to the positioning channel at a start time of the positioning service period or to switch to the positioning channel at a random time point between a start time and an end time of the positioning service period.

17. An access point, comprising:
   an obtaining unit, configured to obtain a positioning service period from a location server;
   a transceiver unit, configured to send the positioning service period and an identifier of a positioning channel to a wireless terminal, so that the wireless terminal switches to the positioning channel in the positioning service period and broadcasts a location measurement message comprising a broadcast sending time through the positioning channel;
   a switching unit, configured to switch to the positioning channel in the positioning service period;
   wherein the transceiver unit is further configured to receive, through the positioning channel, the location measurement message broadcast by the wireless terminal; and
   a control unit, configured to, after the transceiver unit receives the location measurement message, obtain positioning measurement data and send the positioning measurement data to the location server, wherein the location server estimates a location of the wireless terminal according to the positioning measurement data sent by at least three access points in an access point group where the access point is located.

18. The access point according to claim 17, wherein the obtaining unit is specifically configured to receive a probe request message sent by the wireless terminal, wherein the probe request message comprise positioning request information, the obtaining unit also configured to send a positioning request message to the location server and to receive the positioning service period sent by the location server.

19. The access point according to claim 17, wherein the obtaining unit is specifically configured to receive a positioning request message sent by the wireless terminal, to send the positioning request message to the location server, and to receive the positioning service period sent by the location server.

20. The access point according to claim 17, wherein the identifier of the positioning channel is pre-configured on the access point or is sent by the location server to the access point.

* * * * *